(12) United States Patent
Wiacek

(10) Patent No.: US 12,069,603 B2
(45) Date of Patent: Aug. 20, 2024

(54) TIME OF ARRIVAL BASED METHOD FOR EXTENDED CONNECTION RANGE

(71) Applicant: Nokia Technologies Oy, Espoo (FI)

(72) Inventor: Fabian Wiacek, Warsaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 339 days.

(21) Appl. No.: 17/630,470

(22) PCT Filed: Jul. 24, 2020

(86) PCT No.: PCT/FI2020/050502
§ 371 (c)(1),
(2) Date: Jan. 26, 2022

(87) PCT Pub. No.: WO2021/048462
PCT Pub. Date: Mar. 18, 2021

(65) Prior Publication Data
US 2022/0264500 A1 Aug. 18, 2022

Related U.S. Application Data

(60) Provisional application No. 62/898,122, filed on Sep. 10, 2019.

(51) Int. Cl.
*H04W 56/00* (2009.01)
*H04W 64/00* (2009.01)
*H04W 74/0833* (2024.01)

(52) U.S. Cl.
CPC ..... *H04W 56/0045* (2013.01); *H04W 64/006* (2013.01); *H04W 74/0833* (2013.01)

(58) Field of Classification Search
CPC ............. H04W 56/003; H04W 56/004; H04W 56/0045; H04W 64/006; H04W 74/0833
See application file for complete search history.

(56) References Cited

U.S. PATENT DOCUMENTS 10,084,535 B1 * 9/2018 Speidel ............. H04B 7/18508
2005/0025095 A1 2/2005 Kim
(Continued)

FOREIGN PATENT DOCUMENTS

| CN | 107223361 A | 9/2017 |
|---|---|---|
| EP | 3328134 A1 | 5/2018 |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 15)", 3GPP TS 36.213, V15.5.0, Mar. 2019, pp. 1-552.
(Continued)

*Primary Examiner* — Pao Sinkantarakorn
(74) *Attorney, Agent, or Firm* — Lippes Mathias LLP

(57) ABSTRACT

A method may include determining a timing advance-limited cell maximum range based on a requested preamble format broadcasted by a network node. The method may also include in response to the user equipment being outside of the timing advance-limited cell maximum range, sending a random access preamble with an initial uplink channel timing adjustment to fit an indicated subframe dedicated for a hearing window. The method may also include in response to the user equipment being outside of the timing advance-limited cell maximum range, additional timing adjustment for any uplink transmission in order to maintain uplink to downlink channel synchronization. In a variant, the method may also include in response to the user equipment being outside of the timing advance-limited cell maximum range, additional timing adjustment for any uplink transmission in order to maintain uplink to downlink channel synchronization.

10 Claims, 20 Drawing Sheets

(56) References Cited

U.S. PATENT DOCUMENTS

| | | | |
|---|---|---|---|
| 2016/0343257 A1 | 11/2016 | Kim | |
| 2018/0084546 A1 | 3/2018 | Guo et al. | |
| 2019/0124615 A1 | 4/2019 | He | |
| 2019/0223178 A1* | 7/2019 | Bergström | H04W 72/0446 |
| 2020/0187151 A1* | 6/2020 | Wang | H04W 36/0058 |
| 2020/0275398 A1* | 8/2020 | Da | H04L 5/0092 |
| 2021/0168871 A1* | 6/2021 | Lee | H04L 7/0033 |

FOREIGN PATENT DOCUMENTS

| | | |
|---|---|---|
| WO | 2017/167243 A1 | 10/2017 |
| WO | 2020/001731 A1 | 1/2020 |
| WO | 2020/001821 A1 | 1/2020 |
| WO | 2021/045786 A1 | 3/2021 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321, V15.4.0, Dec. 2018, pp. 1-131.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.4.0, Dec. 2018, pp. 1-363.

"3rd Generation Partnership Project; Technical Specification Group Radio Access Network; Evolved Universal Terrestrial Radio Access (E-UTRA); Physical channels and modulation (Release 15)", 3GPP TS 36.211, V15.5.0, Mar. 2019, pp. 1-238.

"3rd Generation Partnership Project; Technical Specification Group Radio Access Network; Evolved Universal Terrestrial Radio Access (E-UTRA); Physical layer; Measurements (Release 15)", 3GPP TS 36.214, V15.3.0, Sep. 2018, pp. 1-25.

"3rd Generation Partnership Project; Technical Specification Group Radio Access Network; Evolved Universal Terrestrial Radio Access (E-UTRA); Requirements for support of radio resource management (Release 16)", 3GPP TS 36.133, V16.1.0, Mar. 2019, pp. 1-3585.

"3rd Generation Partnership Project; Technical Specification Group Radio Access Network; Solutions for NR to support non terrestrial networks (NTN) (Release 16)", 3GPP TR 38.821, V0.4.0, Mar. 2019, pp. 1-46.

"3rd Generation Partnership Project; Technical Specification Group Radio Access Network; Feasibility study for Further Advancements for E-UTRA (LTE-Advanced) (Release 15)", 3GPP TR 36.912, V15.0.0, Jun. 2018, pp. 1-62.

International Search Report and Written Opinion received for corresponding Patent Cooperation Treaty Application No. PCT/FI2020/050502, dated Nov. 3, 2020, 12 pages.

Extended European Search Report received for corresponding European Patent Application No. 20862667.1, dated Jul. 12, 2023, 7 pages.

Office action received for corresponding Chinese Patent Application No. 202080057351.X, dated Jan. 15, 2024, 6 pages of office action and no page of translation available.

* cited by examiner

| LTE PRACH Preamble Format | CP Length [ms] | Sequence Length [ms] | Guard Time [ms] | Total Length [ms] | Guard Time equivalent distance [km] | Maximum Cell Range [km] |
|---|---|---|---|---|---|---|
| 0 | 0.10 | 0.80 | 0.10 | 1 | 10 | 15 |
| 1 | 0.68 | 0.80 | 0.52 | 2 | 156 | 78 |
| 2 | 0.20 | 1.60 | 0.20 | 2 | 60 | 30 |
| 3 | 0.68 | 1.60 | 0.72 | 3 | 216 | 108 |

FIG. 1

| PRACH Configuration Index | Preamble Format | System frame number | Subframe number | PRACH Configuration Index | Preamble Format | System frame number | Subframe number |
|---|---|---|---|---|---|---|---|
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |
| 5 | 0 | Any | 7 | 37 | 2 | Any | 7 |
| 6 | 0 | Any | 1, 6 | 38 | 2 | Any | 1, 6 |
| ... | ... | ... | ... | ... | ... | ... | ... |
| 27 | 1 | Any | 3, 6, 9 | 59 | 3 | Any | 3, 6, 9 |
| 28 | 1 | Any | 0, 2, 4, 6, 8 | 60 | N/A | N/A | N/A |
| 29 | 1 | Any | 1, 3, 5, 7, 9 | 61 | N/A | N/A | N/A |
| 30 | N/A | N/A | N/A | 62 | N/A | N/A | N/A |
| 31 | 1 | Even | 9 | 63 | 3 | Even | 9 |

FIG. 2

| Platforms | Altitude range | Orbit | Typical beam footprint size |
|---|---|---|---|
| Low-Earth Orbit (LEO) satellite | 300-1500 km | Circular around the earth | 100-500 km |
| Medium-Earth Orbit (MEO) satellite | 7000-25000 km | | 100-500 km |
| Geostationary Earth Orbit (GEO) satellite | 35 786 km | notional station keeping position fixed in terms of elevation/azimuth with respect to a given earth point | 200-1000 km |
| UAS platform (including HAPS) | 8 - 50 km (20 km for HAPS) | | 5 - 200 km |
| High Elliptical Orbit (HEO) satellite | 400-50000 km | Elliptical around the earth | 200-1000 km |

FIG. 3

TIME OF ARRIVAL BASED METHOD FOR EXTENDED CONNECTION RANGE

RELATED APPLICATION

This application was originally filed as PCT Application No. PCT/FI2020/050502 on Jul. 24, 2020, which claims priority from U.S. provisional patent application No. 62/898,122 filed on Sep. 10, 2019, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for a time of arrival (TOA) based method for an extended connection range.

SUMMARY

Some example embodiments are directed to a method. The method may include determining, by a user equipment, a timing advance-limited cell maximum range based on a requested preamble format broadcasted by a network node. The method may also include in response to the user equipment being outside of the timing advance-limited cell maximum range, sending a random access preamble with an initial uplink channel timing adjustment to fit an indicated subframe dedicated for a hearing window.

Other example embodiments may be directed to an apparatus. The apparatus may include at least one processor and at least one memory including computer program code. The at least one memory and computer program code may also be configured to, with the at least one processor, cause the apparatus at least to determine a timing advance-limited cell maximum range based on a requested preamble format broadcasted by a network node. The apparatus may also be caused to, in response to the apparatus being outside of the timing advance-limited cell maximum range, send a random access preamble with an initial uplink channel timing adjustment to fit an indicated subframe dedicated for a hearing window.

Other example embodiments may be directed to an apparatus. The apparatus may include means for determining a timing advance-limited cell maximum range based on a requested preamble format broadcasted by a network node. The apparatus may also include means for, in response to the apparatus being outside of the timing advance-limited cell maximum range, means for sending a random access preamble with an initial uplink channel timing adjustment to fit an indicated subframe dedicated for a hearing window.

In accordance with other example embodiments, a non-transitory computer readable medium may be encoded with instructions that may, when executed in hardware, perform a method. The method may include determining, by a user equipment, a timing advance-limited cell maximum range based on a requested preamble format broadcasted by a network node. The method may also include in response to the user equipment being outside of the timing advance-limited cell maximum range, sending a random access preamble with an initial uplink channel timing adjustment to fit an indicated subframe dedicated for a hearing window.

Other example embodiments may be directed to a computer program product that performs a method. The method may include determining, by a user equipment, a timing advance-limited cell maximum range based on a requested preamble format broadcasted by a network node. The method may also include in response to the user equipment being outside of the timing advance-limited cell maximum range, sending a random access preamble with an initial uplink channel timing adjustment to fit an indicated subframe dedicated for a hearing window.

Other example embodiments may be directed to an apparatus that may include circuitry configured to determine a timing advance-limited cell maximum range based on a requested preamble format broadcasted by a network node. The apparatus may also include circuitry configured to, in response to the apparatus being outside of the timing advance-limited cell maximum range, send a random access preamble with an initial uplink channel timing adjustment to fit an indicated subframe dedicated for a hearing window.

Certain example embodiments may be directed to a method. The method may include transmitting time of arrival data to a user equipment. The method may also include receiving a report with a time of arrival-based index value from the user equipment. The method may further include receiving a random access channel preamble including at least one of an initial uplink channel timing adjustment and a time of arrival-based correction index value. Further, the method may include establishing or maintaining a connection with the user equipment based on at least one of the initial uplink channel timing adjustment and the time of arrival-based correction index value.

Other example embodiments may be directed to an apparatus. The apparatus may include at least one processor and at least one memory including computer program code. The at least one memory and computer program code may be configured to, with the at least one processor, cause the apparatus at least to transmit time of arrival data to a user equipment. The apparatus may also be caused to receive receiving a report with a time of arrival-based index value from the user equipment. The apparatus may further be caused to receive a random access channel preamble including at least one of an initial uplink channel timing adjustment and a time of arrival-based correction index value. Further, the apparatus may be caused to establish or maintain a connection with the user equipment based on at least one of the initial uplink channel timing adjustment and the time of arrival-based correction index value.

Other example embodiments may be directed to an apparatus. The apparatus may include means for transmitting time of arrival data to a user equipment. The apparatus may also include means for receiving a report with a time of arrival-based index value from the user equipment. The apparatus may further include means for receiving a random access channel preamble including at least one of an initial uplink channel timing adjustment and a time of arrival-based correction index value. Further, the apparatus may include means for establishing or maintaining a connection with the user equipment based on at least one of the initial uplink channel timing adjustment and the time of arrival-based correction index value.

In accordance with other example embodiments, a non-transitory computer readable medium may be encoded with instructions that may, when executed in hardware, perform a method. The method may include transmitting time of arrival data to a user equipment. The method may also include receiving a report with a time of arrival-based index value from the user equipment. The method may further include receiving a random access channel preamble including at least one of an initial uplink channel timing adjustment and a time of arrival-based correction index value. Further, the method may include establishing or maintaining a connection with the user equipment based on at least one of the initial uplink channel timing adjustment and the time of arrival-based correction index value.

Other example embodiments may be directed to a computer program product that performs a method. The method may include transmitting time of arrival data to a user equipment. The method may also include receiving a report with a time of arrival-based index value from the user equipment. The method may further include receiving a random access channel preamble including at least one of an initial uplink channel timing adjustment and a time of arrival-based correction index value. Further, the method may include establishing or maintaining a connection with the user equipment based on at least one of the initial uplink channel timing adjustment and the time of arrival-based correction index value.

Other example embodiments may be directed to an apparatus that may include circuitry configured to transmit time of arrival data to a user equipment. The apparatus may also include circuitry configured to receive a report with a time of arrival-based index value from the user equipment. The apparatus may further include circuitry configured to receive a random access channel preamble including at least one of an initial uplink channel timing adjustment and a time of arrival-based correction index value. Further, the apparatus may include circuitry configured to establish or maintain a connection with the user equipment based on at least one of the initial uplink channel timing adjustment and the time of arrival-based correction index value.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

BRIEF DESCRIPTION OF THE DRAWINGS

For proper understanding of example embodiments, reference should be made to the accompanying drawings, wherein:

FIG. 1 illustrates example random access preamble parameters described in 3GPP TS 36.211.

FIG. 2 illustrates a frame structure type 1 random access configuration for preamble formats 0-3, as described in 3GPP TS 36.211.

FIG. 3 illustrates multiple possible scenarios for non-terrestrial networks deployment with respect to a cell maximum range and coverage.

DETAILED DESCRIPTION

Figure 4:
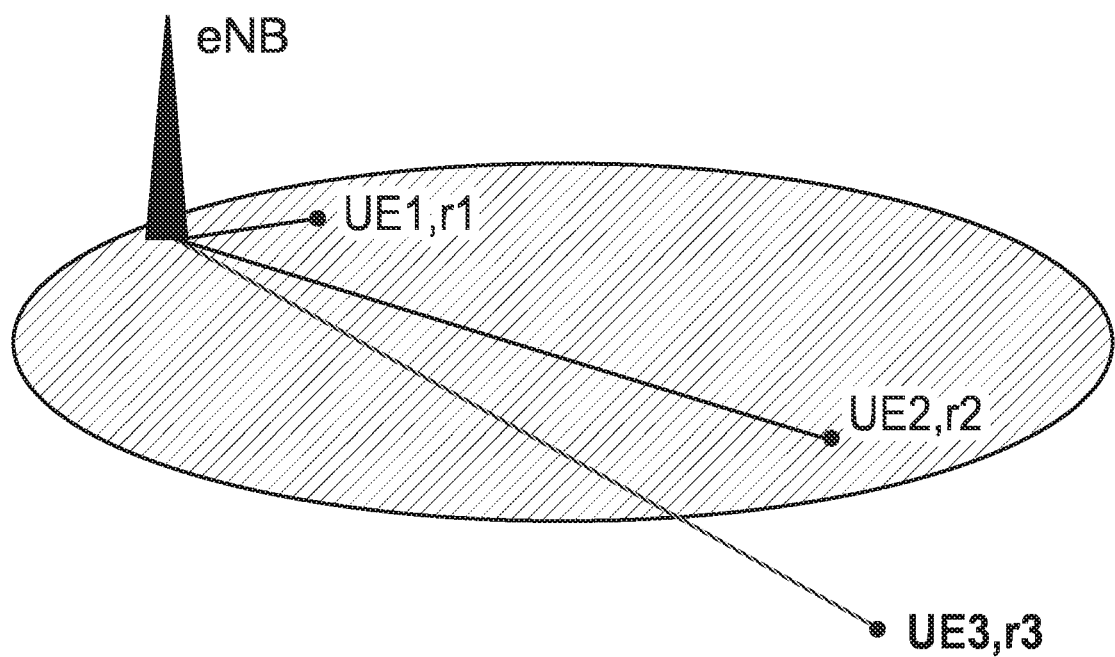
FIG. 4 illustrates three user equipments that may be able to receive eNB packet-switched streaming service or secondary synchronization signal transmissions.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for a time of arrival (TOA) based method for an extended connection range.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

A time of arrival (TOA) based method may be utilized for uplink (UL) channel synchronization. Certain TOA elements and physical random access channel (PRACH) preambles have been described in 3$^{rd}$ Generation Partnership Project (3GPP) technical specifications ($T_S$). Additional information regarding random access preamble parameters are illustrated in FIG. 1, which illustrates example random access preamble parameters described in 3GPP TS 36.211. In addition, FIG. 2 illustrates a frame structure type 1 random access configuration for preamble formats 0-3, as described in 3GPP TS 36.211.

As illustrated in FIG. 2, each preamble format frame may have a corresponding defined structure identified by a physical random access channel (PRACH) configuration index. This means that the user equipment (UE) may have information of when or to which subframe the given preamble may be delivered to be correctly detected and processed by the evolved Node B (eNB). The UE uplink (UL) channel synchronization and maintenance may be enabled by a timing advance (TA) command. For example, the initial UE uplink (UL) channel synchronization may be determined in the form of Eq. 1 shown below.

$$N_{TA} = T_A * 16 * T_S \quad \text{(Eq. 1)}$$

As shown in Eq. 1, $T_A$ may represent a timing advance index value provided by the eNB, and may be in the form of 11-bits. In addition, $T_S$ may represent a basic time unit, and $N_{TA}$ may represent an UL timing adjustment.

In a medium access control (MAC) control element (CE) update for UE mobility handling, the following Eq. 2 may be provided.

$$N_{TA,new} = N_{TA,old} + (T_A - 31) * 16 \quad \text{(Eq. 2)}$$

As shown in Eq. 2, $T_A$ may represent by 6-bits (0, . . . , 63), $N_{TA,new}$ may represent a new timing adjustment value, and $N_{TA,old}$ may represent a current timing adjustment. Additionally, as illustrated in FIG. 3, there may be multiple possible scenarios for non-terrestrial networks (NTN) deployment with respect to a cell maximum range and coverage.

Further, in certain wireless communication standards such as Global System for Mobile communication (GSM), LTE, 5G and NTN, there may be a maximum cell range. The maximum cell range in these various wireless communication standards may be characterized with certain limitations. Some of these limitations, for example, may include a tower mast height (or equivalent), which may determine possible line of sight ranges. Another limitation may include a power budget, which may include for example, antenna power gain, transmission power, and receiver sensitivity both for the eNB and the UE. A further limitation may include signal path losses, which may depend on the frequency and propagation medium. In addition, a limitation may include the presence of obstacles, which may additionally attenuate or reflect transmitted signals. Further, a limitation may include a required throughput, which may depend on technology and propagation channel quality. Another limitation may include the need for UL to downlink (DL) channel synchronization for synchronous transmissions, which may be provided and maintained by TA index values. Thus, as can be seen from these various limitations, the cell operational range may be affected even if other factors allow for a UE connection on a higher range.

FIG. 4 illustrates three UEs that may be able to receive eNB packet-switched streaming service, primary synchronization signal (PSS) and secondary synchronization signal (SSS) transmissions. As illustrated in FIG. 4, UE1 and UE2 may be located within the cell coverage area, and UE 3 may be located outside the coverage area with respect to a maximum TA index value. For TA, an initial distance calculation may be based on measurement of a guard period after successful decoding of the PRACH Preamble. Further, in FIG. 4, a distance to the eNB may be inversely proportional to a guard period. For instance, the RACH Preamble may be received at a later time compared to the farther UE2 with respect to UE1, which may be closer to the eNB.

Figure 5:
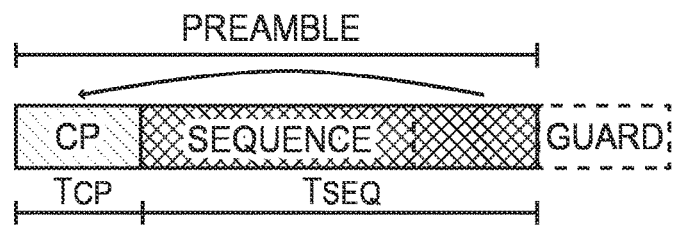
FIG. 5 illustrates an example physical random access channel.

FIG. 5 illustrates an example of PRACH. As illustrated in FIG. 5, the PRACH may include several portions including, for example, a cyclic prefix (CP), sequence, and guard or guard time. In addition, the PRACH may include a preamble made up of the CP and the sequence.

Figure 6:
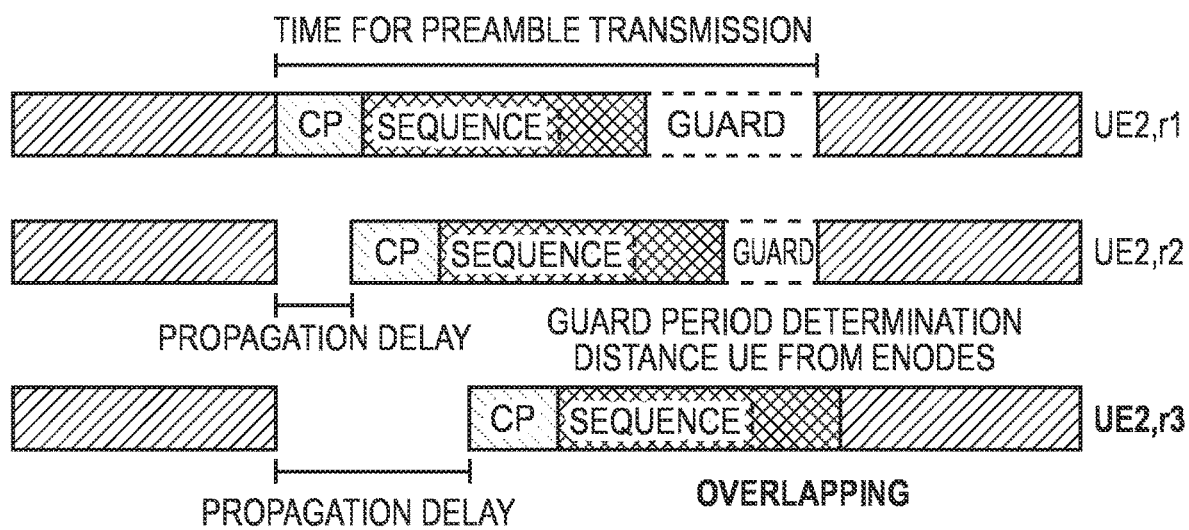
FIG. 6 illustrates an initial user equipment distance to an eNB calculation scheme.

FIG. 6 illustrates an initial UE distance to the eNB (TA) calculation scheme. In particular, FIG. 6 illustrates different UE's distances within the same cell. FIG. 6 also illustrates that the RACH Preamble from UE3 received at the eNB may overlap the next subframe. This may suggest that the preamble from UE3 may not be correctly decoded by the eNB, and UE3 may not be connected to the eNB. Such a scenario may be characterized as the TA related maximum cell range limitation.

Figure 7:
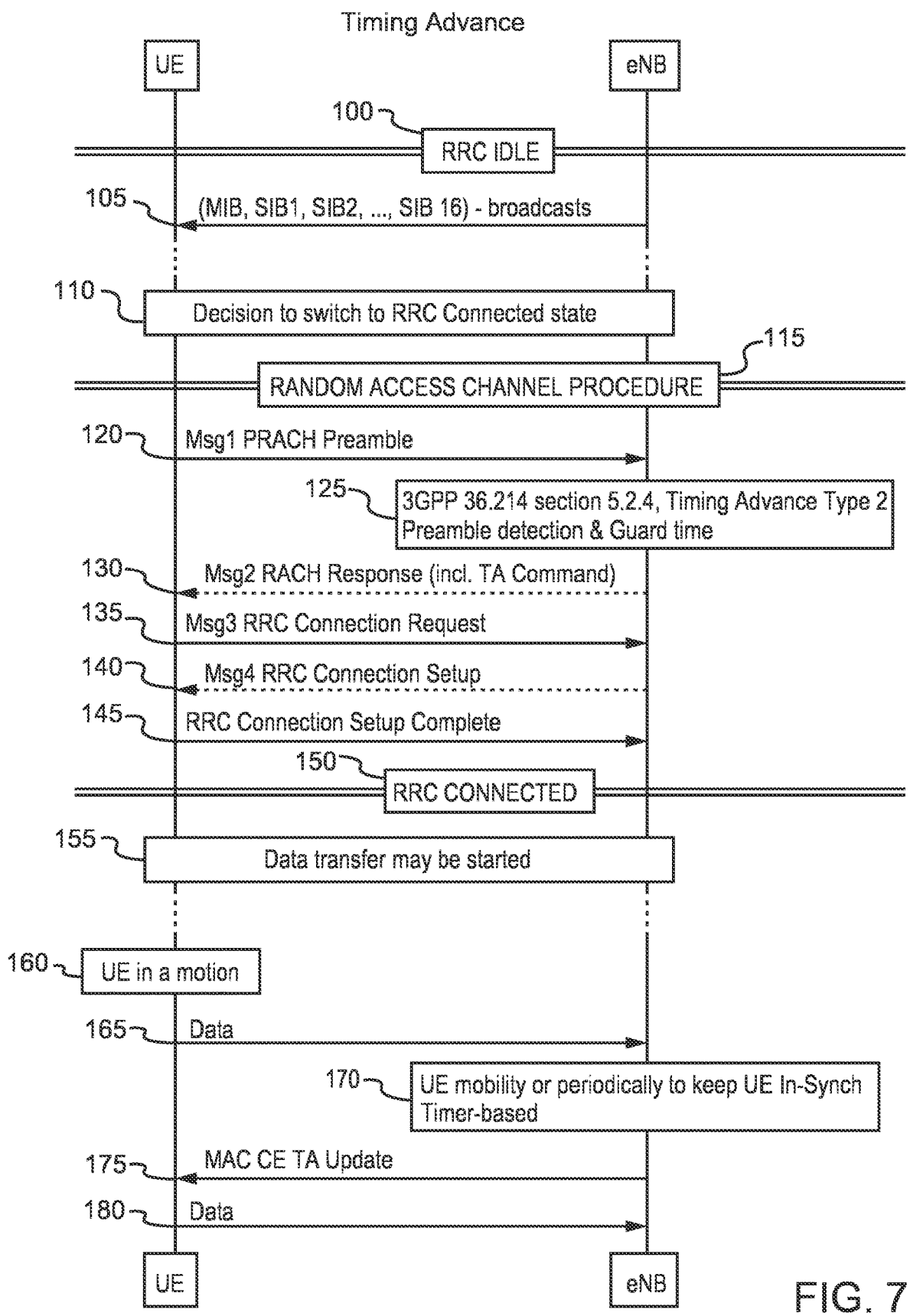
FIG. 7 illustrates a legacy timing advance calculation and application mechanism described in 3GPP 36.214.

FIG. 7 illustrates a legacy timing advance calculation and application mechanism described in 3GPP 36.214. In particular, FIG. 7 illustrates a process of UL channel synchronization (TA command, MAC CE TA update) for LTE as a reference. For example, at 100, the UE may be in a radio resource control (RRC) idle state. While in this idle state, at 105, the UE may receive broadcasts from the eNB, where SIB2 may include data required for synchronization. At 110, once the UE decides to switch to an RRC connected state, a RACH procedure may be initiated between the UE and eNB. Under RACH, the UE may at 120, send Msg1 with the PRACH Preamble. At 125, the eNB may decode the received PRACH Preamble, and based on the preamble type and guard time period, the eNB may calculate a TA correction for the UE.

At 130 of FIG. 7, the eNB may send a Msg2 RACH response to the UE, which includes the TA correction (TA command). This initial TA correction may be used for UL to DL channel synchronization, and the UE may use the provided TA command to adjust its UL transmission for the next message. As further illustrated in FIG. 7, at 135, the UE may send Msg3 to the eNB with an RRC connection request. At 140, the eNB may send Msg4 to the UE with an RRC setup. After the RRC setup is completed, the UE may send an RRC connection setup complete message at 145.

At 150, the UE may switch to an RRC connected state, and at 155, data transfer between the UE and eNB may begin. As indicated at 160, the UE may be in motion. At 165, the UE may send data in the UL direction to the eNB. However, at 170, due to UE mobility, the initial TA correction may not be valid. As such, the eNB may detect a TA drift of the UE's UL transmission and may, at 175, decide to send a MAC CE TA update correction to the UE. The UE may then receive the MAC CE TA update in a #n subframe, and apply the TA correction starting from the #n+6 UL subframe. In addition, at 180, the UE may send additional data to the eNB.

To some extent, MAC CE TA update (6-bits) may allow for maintaining a connection beyond the given cell edge as long as the TA correction is still within the MAC CE TA update range. However, if such UE is requested to perform RACH for re-establishment, resynchronization or any other reason, such connection may not be restored. Further, as illustrated in FIG. 7, the eNB may use the TA command or MAC CE TA update, which carries TA index values $T_A$, for UL timing adjustment $N_{TA}$, as described in 3GPP TS 36.211 and illustrated in FIG. 8. In addition, reception of DL radio frame may be a reference for UL timing adjustment, and $N_{TA\ offset}$ may be omitted for simplicity.

The legacy TA method is described in related 3GPP standards, which define current solutions used for UL channel synchronization. In certain example embodiments, the UE may be beyond the TA-limited maximum operational cell range, and therefore may not be able to establish a connection with the given eNB. This may at least be because the eNB may not be able to correctly decode the RACH Preamble or send an adequate TA index value required for UL channel timing adjustment.

According to certain example embodiments, to enable correct reception of RACH Preamble from an extended connection range, the RACH Preamble may need to be sent with TOA-based initial UL channel synchronization to fit in a defined subframe dedicated for a hearing window. This may differ from the legacy RACH Preamble procedure, as the legacy RACH Preamble is sent with respect to a reference DL frame, and its delay within the hearing window expressed as a guard period may be inversely proportional to a distance between the eNB and UE. This may suggest that the TA-based distance calculated by the eNB for the UE used TOA-based method for an extended connection range may not reflect the real UE distance from the eNB.

According to an example embodiment, for an extended connection range, the TOA-based UL channel timing adjustment value may be proportional to the reference signal propagation delay. In addition, the TOA-based UL channel timing adjustment value may be higher than a TA maximum correction index value. Further, the TA value provided by the eNB may not be needed for UL channel timing adjustment, as the TOA method may be solely used for this purpose within a cell nominal range (TA-limited). However, as described for the RACH Preamble procedure, the UE may need to calculate, based on requested preamble format broadcasted by the eNB TA-based maximum cell range (MaxTA) to determine, whether the RACH Preamble needs to be sent with an initial UL channel timing adjustment to fit the indicated subframe dedicated for the hearing window. For this purpose, the UE may calculate MaxTA, and may compare it with a TOA-based equivalent of the TA index value $TA_d(T_S)$.

In an example embodiment, based on TOA principles, a propagation delay distance between the UE and the eNB, $D(T_S)$ may be calculated using Eq. 3.

$$D(T_S)=c*(T_1(T_S)-T_0(T_S))[m] \quad (Eq.\ 3)$$

In Eq. 3, $T_0$ represents a reference signal physical transmission time by the eNB, $T_1$ represents a reference signal reception time by the UE, c represents the speed of light, $T_S$ represents a basic time unit and which measurement defines accuracy, and $D(T_S)$ represents a signal propagation delay distance. The reference signal may be any specified frame, subframe or symbol.

According to an example embodiment, the TOA method may be used for dynamic motion scenarios. For example, the TOA method may be used where a prediction of an exact timing adjustment may be needed. For simplicity, $D(T_S)$ may cover this application. Further, distance $D(T_S)$ may be expressed in the form of an index value, and Eq. 4 may include a similar meaning to the eNB-derived TA index value.

$$TA_d(T_S) = \text{int}\left[\frac{D(T_S)}{1T_A}\right] \quad (Eq.\ 4)$$

In Eq. 4, $D(T_S)$ represents a signal propagation delay distance, $1T_A$ represents 78 m, minimal step, and $TA_d(T_S)$ represents a TOA-based equivalent of the TA index value.

In a further example embodiment, the TOA-based index value $TA_d(T_S)$ for the extended range connection may replace the legacy $T_A$ in Eq. 1, and may be expressed by Eq. 5 as follows.

$$N_{TA,TAd}(T_S)=TA_d(T_S)*16*T_S \quad (Eq.\ 5)$$

In Eq. 5, $TA_d(T_S)$ represents a TOA-based index value for a required UL channel timing adjustment for a UE outside the TA-limited cell range. Further, $N_{TA,Tad}(T_S)$ represents a TOA-based UL channel timing adjustment supporting an extended connection range, and $T_S$ represents a basic time unit, which measurement defines accuracy. In an example embodiment, Eq. 5 may be used for UE mobility handling.

According to certain example embodiments, it may be possible to use TOA principles to determine a reference signal propagation-based distance between the UE and the eNB, and determine whether the UE is beyond the TA-limited cell maximum range. In one example embodiment, the determination may be based on a requested RACH preamble format. Further, if the UE is considered to be beyond the cell TA-limited maximum range, a TOA-based correction may be added to calculate, by the eNB, a TA index value for establishing and maintaining the connection in case of an extended range connection.

In an example embodiment, for a UE beyond the TA-limited range, the RACH Preamble may be sent $T_{TOATEXT}(T_S)$ earlier with respect to a received DL frame by a TOA-based correction with respect to the given RACH Preamble format timing to fit the hearing window. In certain example embodiments, the RACH Preamble may be triggered when the specified DL frame (#n) was received by the UE. In one example embodiment, this event may be used as a time reference. In another example embodiment, the UE may send the RACH Preamble before the given reference DL frame (#n) was received. AS LTE/5G (synchronous standards) transmissions frame structure may be continuous, and stable (with $T_S$ accuracy) due to PSS/SSS synchronization, reception of the DL frame (#n−1) may be used as a reference for RACH Preamble triggering. Thus, an earlier transmission may be possible. Certain example embodiments may be applied for the ground mobile network and for NTN applications. For instance, TOA-based correction $T_{TOAEXT}(T_S)$ for extended range connection may be added to Eq. 1, with respect to the concept illustrated in FIG. 8. This may be represented by Eq. 6a.

$$N_{TA,TOAEXT}(T_S)=T_A+T_{TOAEXT}(T_S))*16*T_S \quad \text{(Eq. 6a)}$$

In Eq. 6a, $T_{TOAEXT}(T_S)$ represents a TOA-based correction index value for the UL channel timing adjustment for a UE outside the TA-limited cell range. Further, $N_{TA,TOAEXT}(T_S)$ represents an UL channel timing adjustment supporting the extended connection range. In addition, $T_A$ is a timing advance index value received from the eNB in re-authorization request (RAR), and $T_S$ is a basic time unit, which measurement defines accuracy. As RACH Preamble is sent with the initial $T_{TOAEXT}(T_S)$ correction, the eNB may detect this UE at the edge of cell coverage, for which maximum $T_A$ index value may be send by eNB as TA correction in TA command.

In another example embodiment, if the UE is beyond the TA-limited range, the RACH Preamble may also be sent earlier by TOA-based correction with respect to the given RACH Preamble format timing to fit the hearing window.

Figure 9:
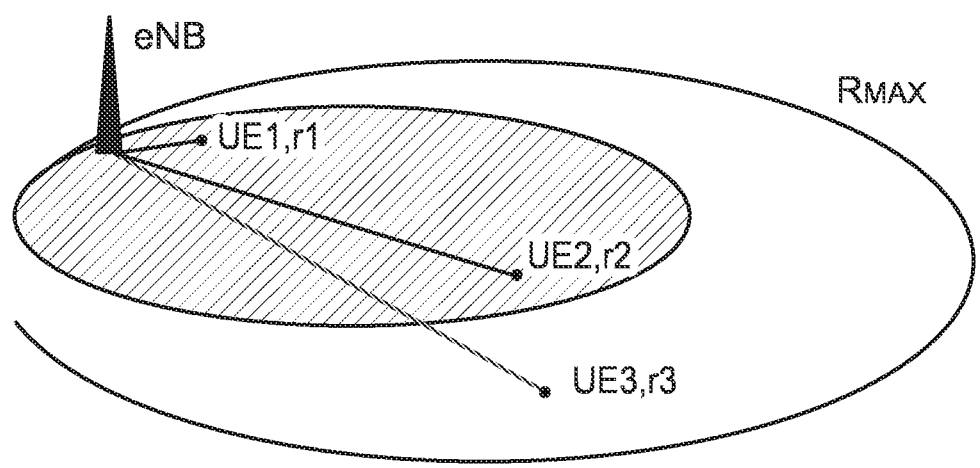
FIG. 9 illustrates a scenario in which the only cell range limitation may be related to power budget or deployment issues such as obstacles, according to an example embodiment.

FIG. 9 illustrates a scenario in which the only cell range limitation may be related to power budget or deployment issues such as obstacles, according to an example embodiment. For example, FIG. 9 illustrates an ability to establish a connection beyond a guard time or TA limitations. As illustrated in FIG. 9, UE3 applying a TOA method for an extended connection range for the RACH Preamble may be RRC connected. This approach is different from that illustrated in FIG. 1, where the UE does not have a chance for establishing a connection due to a maximum TA-limitation. In another example embodiment, the UE3 applying a TOA-based correction to the UL channel timing adjustment for the RACH Preamble may be in the RRC CONNECTED STATE or switch to the RRC CONNECTED state.

In FIG. 9, the parameter $R_{max}$ may indicate a maximum extended connection range for a given UE. In addition, this parameter may include cell specific characteristics and range limiters, and UE characteristics such as power level or supported connection technologies. The supported connection technologies may include beamforming or spatial multiplexing, which may also be used for the provision of an extended range connection. Further, $R_{max}$ may reflect certain weather conditions and the conditions' impact on microwave signal propagation and attenuation. As such, $R_{max}$ may, in certain circumstances, not be clearly specified.

Figure 10A:
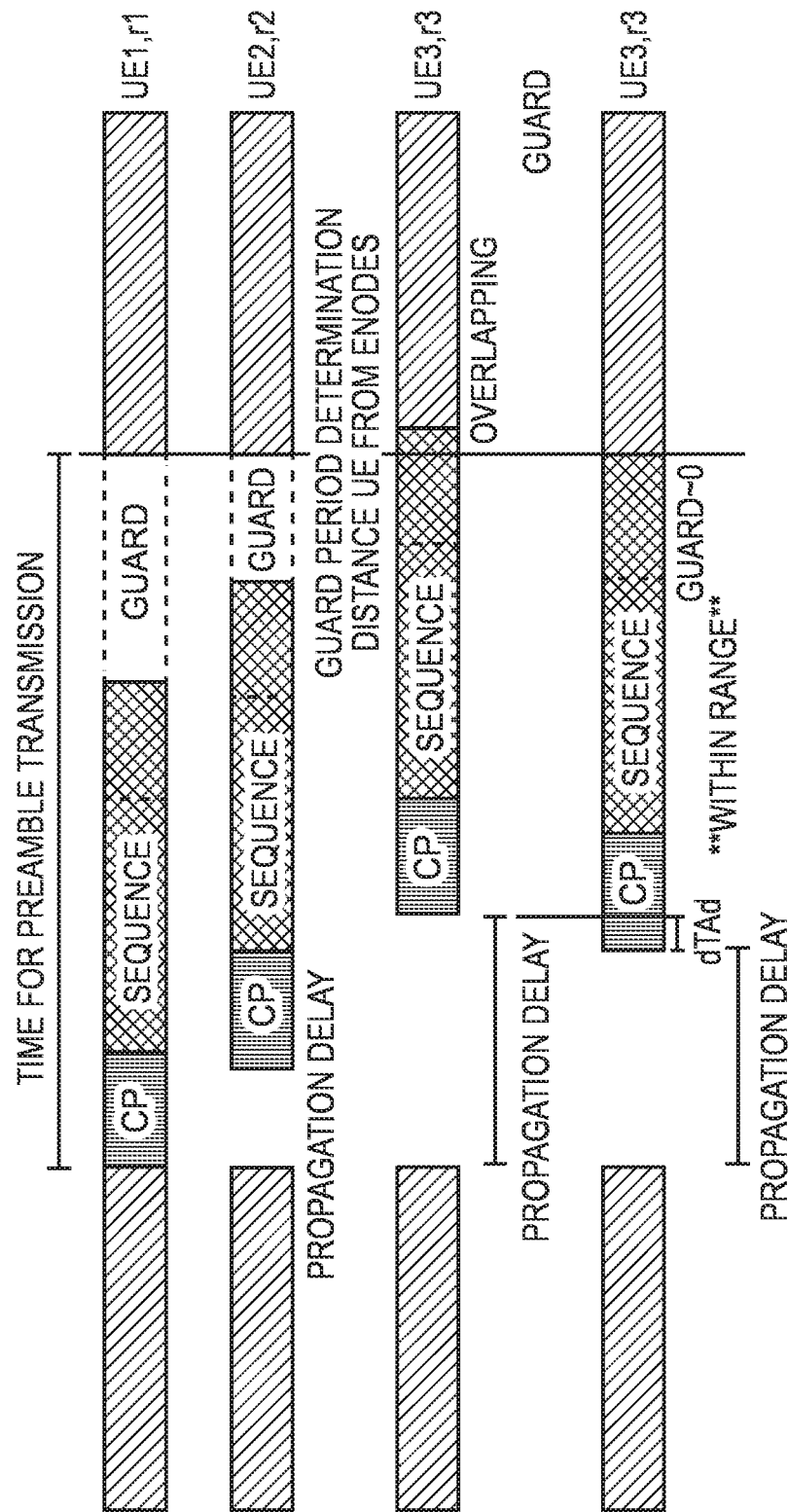
FIG. 10(a) illustrates a practical application of $N_{TA,TAd}$ ($T_S$) for uplink channel timing adjustment for random access channel preamble for an extended connection range, according to an example embodiment.

FIG. 10(a) illustrates a practical application of $N_{TA,TAd}$ $(T_S)$, (Eq. 5) for UL channel timing adjustment for RACH Preamble for an extended connection range, according to an example embodiment. For instance, FIG. 10(a) illustrates an initial UE distance to eNB (TA) calculation scheme that is enhanced by $T_{TOAEXT}(T_S)$. As illustrated in FIG. 10, the UE may send the RACH Preamble using $dTA_d(T_S)$ as an initial UL channel timing adjustment in order to reach the proper hearing window within its limits, which may enable proper decoding of such request by the eNB. Certain example embodiments may take into consideration that the UE may know the signal frame structure in FIG. 2, and necessary timing relations in FIG. 1. This may indicate that the UE may apply adequate $dTA_d(T_S)$ UL channel timing adjustment for the RACH Preamble for an extended range connection where the DL #n−1 frame may be used as a reference.

Figure 10B:
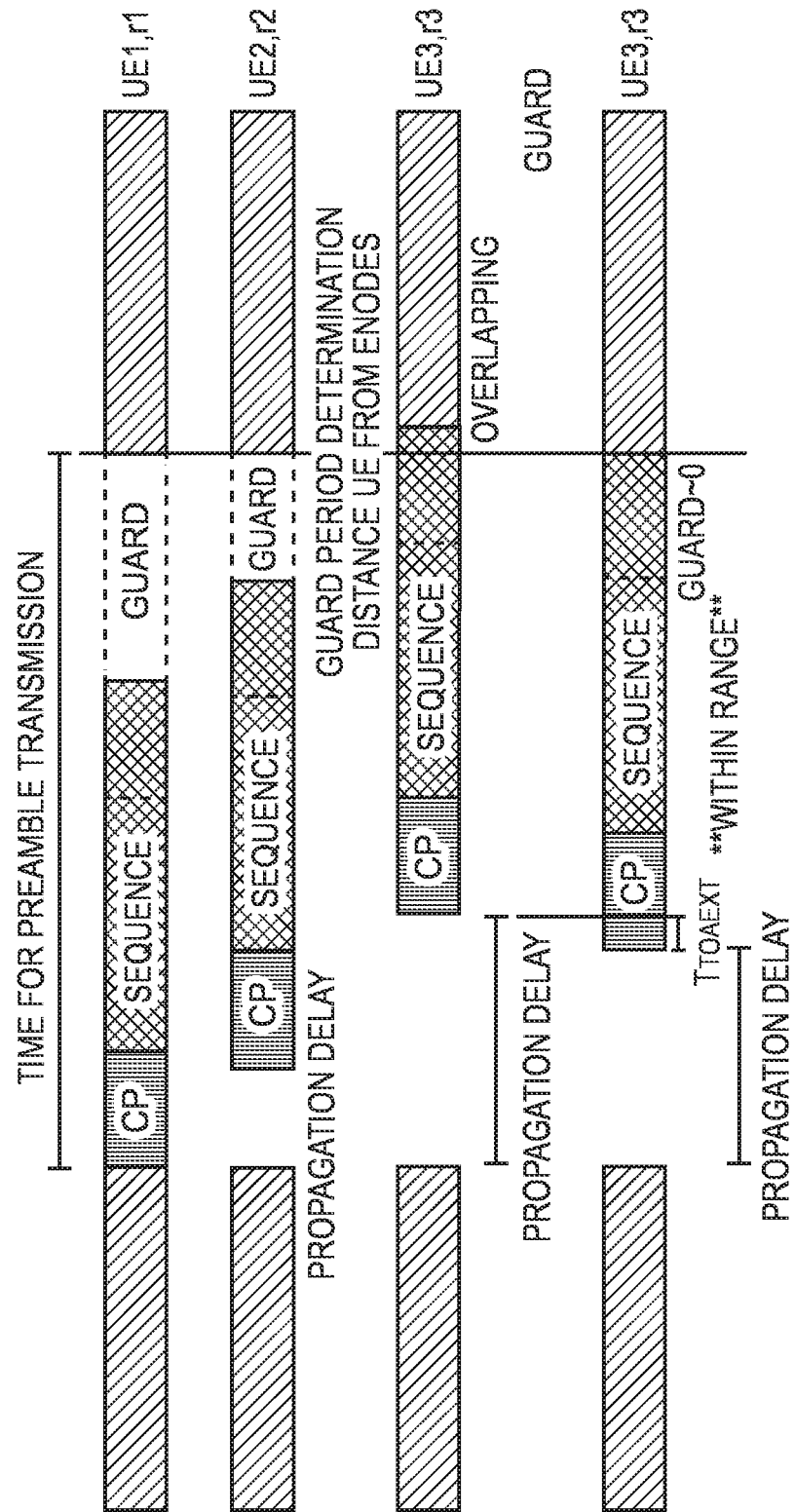
FIG. 10(b) illustrates a practical application of $N_{TA,toAEXT}(T_S)$ with a time of arrival-based correction for uplink channel timing adjustment for random access channel preamble for an extended connection range, according to an example embodiment.

FIG. 10(b) illustrates a practical application of $N_{TA, TOAEXT}(T_S)$ with a TOA-based correction (Eq. 6a) for UL channel timing adjustment for RACH Preamble for an extended connection range, according to an example embodiment. As illustrated ins FIG. 10(b), UE3 may send RACH Preamble $T_{TOAEXT}(T_S)$ earlier in order to reach the indicated hearing window within its limits. This may enable proper decoding of such request by the eNB, and should be taken into that UE3 may know the signal frame structure illustrated in FIG. 2, and the necessary timing relations illustrated in FIG. 1. This may indicate that the UE3 may apply a minimal necessary $T_{TOAEXT}(T_S)$ UL timing adjustment value, which may be interpreted by the eNB as UE3 may be near the edge of the given cell.

According to an example embodiment, due to the potential higher range, other factors may have an impact on the possibility to establish a connection. However, as illustrated in FIG. 6, under the same conditions, UE3 may not be able to establish a connection, whereas at FIG. 10(b), UE3 may still gain access to the network. Thus, according to certain example embodiments, it may be possible to provide significant benefits for handling UE mobility, especially for scenarios where connections maybe lost or terminated due to TA limitation(s).

According to an example embodiment, for the RACH Preamble for an extended range connection, an initial UL channel timing adjustment $N_{TA,dTAd, RACH}(T_S)$ may be equal to Eq. 6b.

$$N_{TA,dTAd,RACH}(T_S)=dTA_d(T_S)*16*T_S \quad \text{(Eq. 6b)}$$

In Eq. 6b, $dTA_d(T_S)$ represents a TOA-based index value for the first UL channel timing adjustment for the UE outside the TA-limited cell range. Further, $N_{TA,dTAd, RACH}(T_S)$ represents a TOA-based initial UL channel timing adjustment supporting the extended connection range, and $T_S$ represents a basic time unit, which measurement defines accuracy.

According to an example embodiment, the TOA-based index value for the first UL channel timing adjustment (RACH Preamble) for extended connection range $dTA_d(T_S)$ may be calculated according to Eq. 7.

$$dTA_d(T_S)=TA_d(T_S)-\text{Max } TA \quad \text{(Eq.7)}$$

Figure 8:
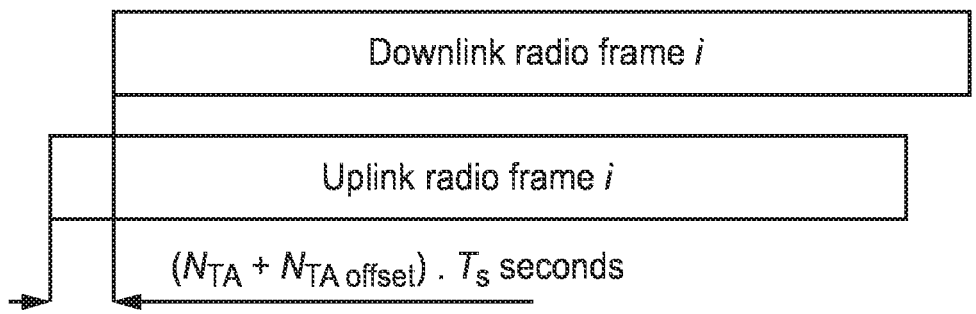
FIG. 8 illustrates an uplink to downlink timing adjustment principle.

In Eq. 7, the index value $dTA_d(T_S)$ expresses a minimum required initial UL channel timing adjustment for the RACH Preamble with respect to the reference DL frame, as illustrated in FIG. 8. According to an example embodiment, the minimum required UL channel timing adjustment may be needed for proper reception of the first UL message from the UE. In this case, the UE may be localized by the eNB (based on TA calculations) at the edge of the cell coverage, but still inside the hearing window, as illustrated in FIG. 10. In addition, the guard period for UE3 may be equal to or near 0. In an example embodiment, by applying $dTA_d(T_S)$ for RACH Preamble TA calculations may not be precise as additional TA may be applied by the UE.

In an example embodiment, the index value $dTA_d(T_S)$, (Eq. 7), may carry information about how much the UE may be beyond the TA-limited cell maximum range. The index value $TA_d(T_S)$ (Eq. 4) may provide information about a distance between the eNB and the UE. If $TA_d(T_S)$ is used instead of $dTA_d(T_S)$ for RACH Preamble, the UE may be within the hearing window, but it may also be located (TA measurement) at the beginning of hearing window. This may cause problems with adequate settings of performance parameters such as power headroom, since power levels should be low for closely related UEs. In this case, the UE may be far beyond the cell nominal range, and the UE may experience problems with the application of such settings. Therefore, the UE may be localized by the eNB at a maximum cell range, but still within the hearing window.

In certain example embodiments, due to higher range, other factors may have an impact on the possibility to establish a connection. However, as illustrated on FIG. 6, in the same condition, the UE may not have a chance for connection whereas in FIG. 10, the UE may gain access to the network. This may result in significant benefits for UE mobility handling, especially for scenarios where the connection may be lost or terminated due to TA-based range limitations.

Figure 11A:
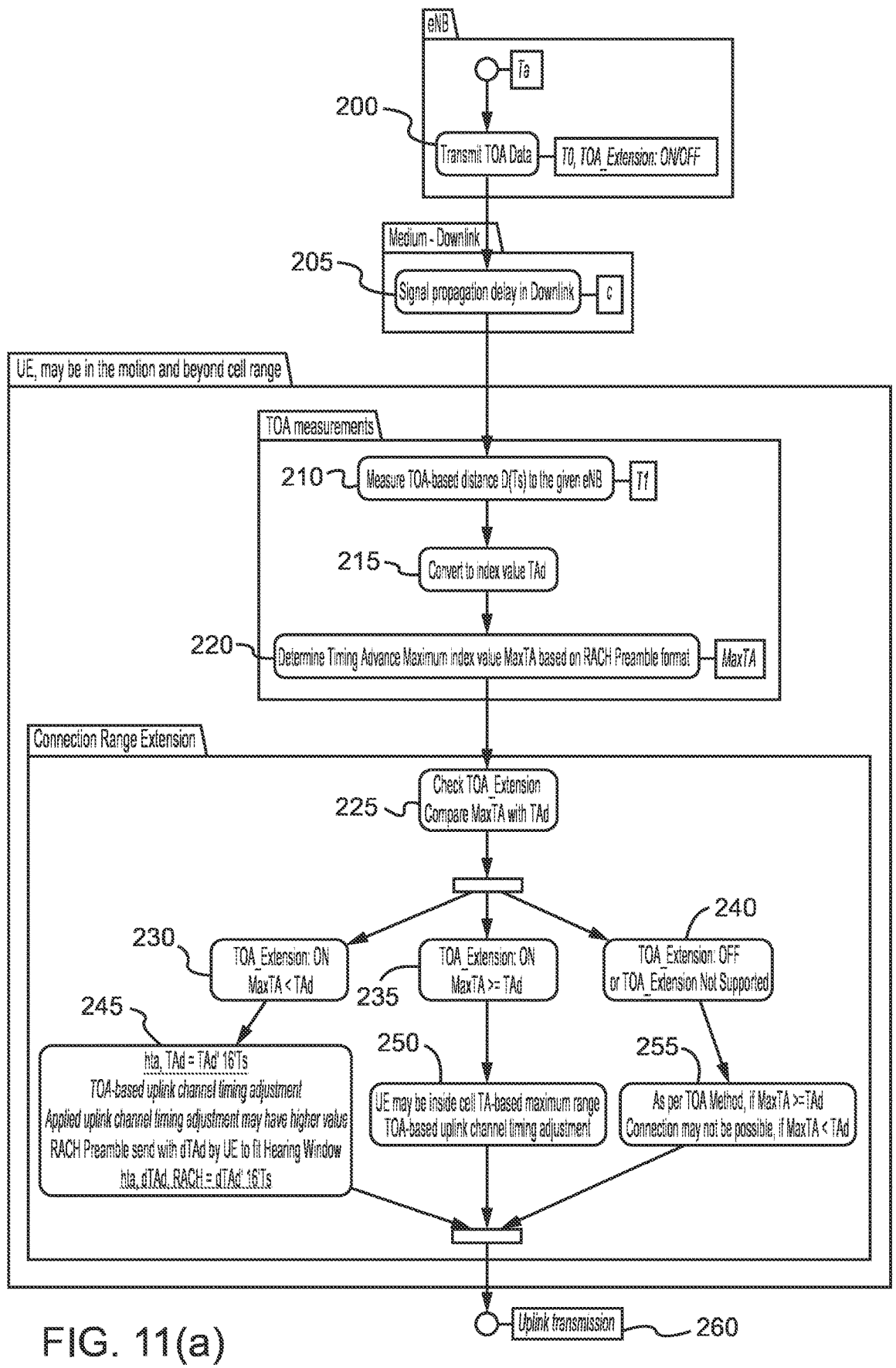
FIG. 11(a) illustrates an activity diagram for time of arrival-based uplink channel timing adjustment for an extended connection range, according to an example embodiment.

FIG. 11(a) illustrates an activity diagram for TOA-based UL channel timing adjustment for an extended connection range, according to an example embodiment. In particular, FIG. 11(a) illustrates an activity diagram that maintains $N_{TA,TAd}(T_S)$ (Eq. 5) and for extended connection range establishing $N_{TA,dTAd}(T_S)$ (Eq. 6b). In an example embodiment, the eNB may support the TOA method, which may include a method specific TOA-Extension information element (IE), which may enable or prohibit the possibility to establish a connection by the UE beyond the TA-defined maximum cell range.

As illustrated in FIG. 11(a), at 200, the eNB may transmit TOA data to the UE. The TOA data may include T0 and/or TAO_Extension: ON/OFF information. At 205, there may be a signal propagation delay in the DL between the eNB and UE. Further, at 210, the UE may perform TOA measurements that may include, for example, measuring a TOA-based distance D(Ts) to the given eNB based on reference signal reception time T1. At 215, the UE may convert the measurements to an index value $TA_d$, and at 220, the UE may determine a timing advance maximum value (MaxTA) based on a RACH Preamble format.

After the MaxTA has been determined, the UE may at 225, check the TOA-Extension, and compare the MaxTA with the $TA_d$. The UE may then, at 230, determine if the TOA_Extension is ON and MaxTA is less than $TA_d$. If the determination at 230 is true, then at 245, the UE may determine that the applied UL channel timing adjustment may have a higher value, and that the RACH Preamble may be sent with dTAd by the UE to fit the hearing window. If, however, the UE determines at 235 that the TOA_Extension is ON and MaxTA is greater than or equal to $TA_d$, then at 250, the UE may be located inside the cell TA-based maximum range. Further, if the UE determines at 240 that the TOA_Extension is OFF, or the TOA_Extension is not supported, then, at 255, it may be determined that the UE is inside the cell TA-based maximum range. However, if MaxTA is less than $TA_d$, connection may not be possible. Additionally, at 260, an UL transmission may be performed from the UE to the eNB.

Figure 11B:
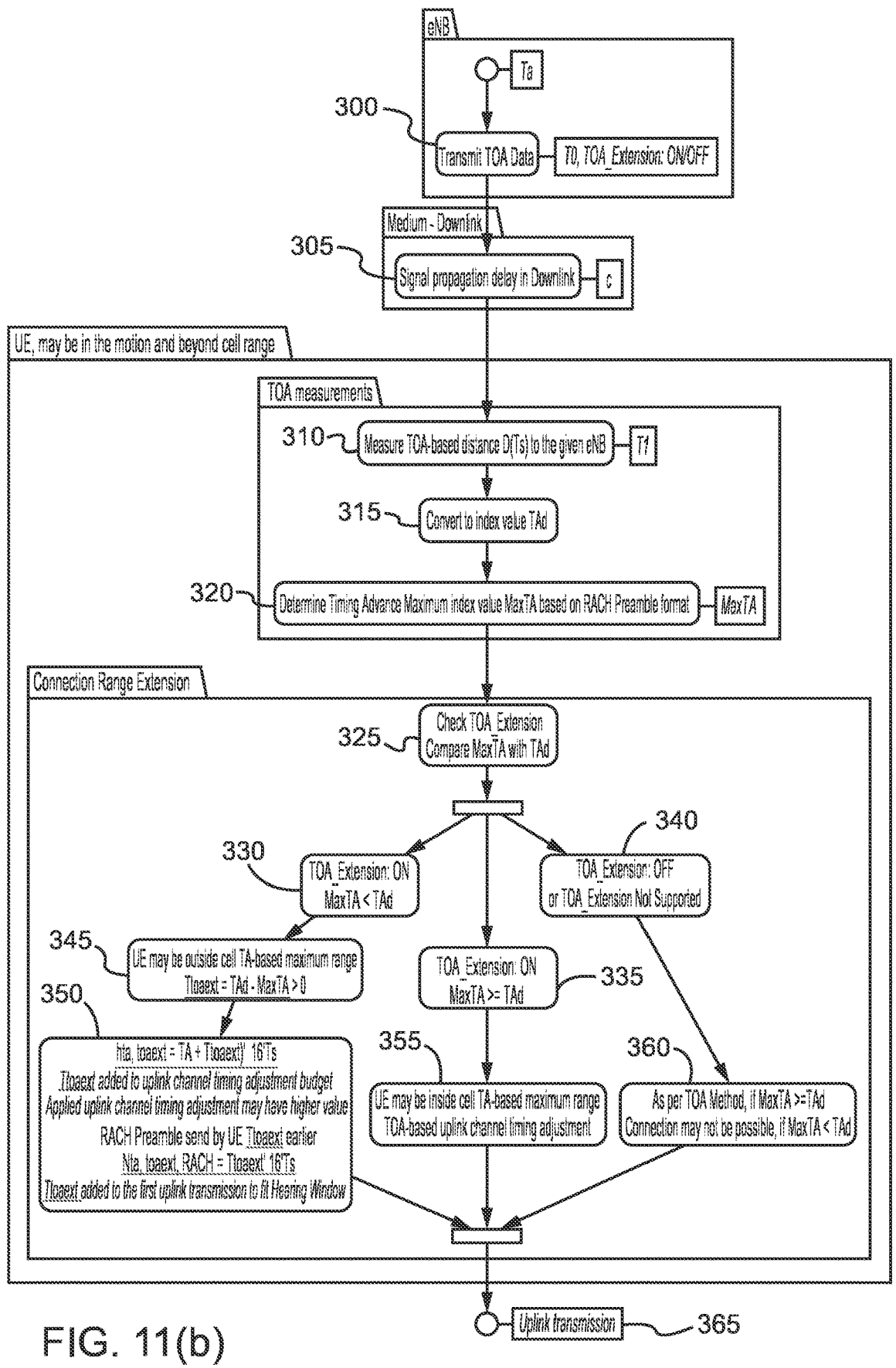
FIG. 11(b) illustrates an activity diagram for time of arrival-based correction added to the uplink channel timing adjustment, according to an example embodiment.

FIG. 11(b) illustrates an activity diagram for TOA-based correction added to the UL channel timing adjustment, according to an example embodiment. In particular, FIG. 11(b) illustrates that the TOA-based correction is added to the UL channel timing adjustment to support the UE extended connection range maintaining $N_{TA,TOAEXT}(T_S)$ (Eq. 6a). As illustrated in FIG. 11(b), at 300, the eNB may transmit TOA data to the UE. The TOA data may include T0 and/or TOA_Extension: ON/OFF information. At 305, there may be a signal propagation delay in the DL between the eNB and UE. Further, at 310, the UE may perform TOA measurements that may include, for example, measuring a TOA-based distance D(Ts) to the given eNB based on reference signal reception time T1. At 315, the UE may convert the measurements to an index value $TA_d$, and at 320, the UE may determine a timing advance maximum value (MaxTA) based on a RACH Preamble format.

After the MaxTA has been determined, the UE may at 325, check the TOA-Extension, and compare the MaxTA with the $TA_d$. The UE may then, at 330, determine if the TOA_Extension is ON and MaxTA is less than $TA_d$. If the determination at 330 is true, then, at 345, it may be determined that the UE may be outside the cell TA-based maximum range. In addition, at 350, the UE may add the Ttoaext to the UL channel timing adjustment budget applied, and the applied UL channel timing adjustment may have a higher value. Furthermore, at 350, the RACH Preamble may be sent by the UE at a time Ttoaext earlier.

However, if at 335, the UE determines that the TOA_Extension is ON and MaxTA is greater than or equal to $TA_d$, then, at 355, it may be determined that the UE may be inside the cell TA-based maximum range. Further, if at 340, the UE determines that the TOA_Extension is OFF or the TOA_Extension is not supported, then, at 360, it may be determined that the UE may be inside the cell TA-based maximum range if MaxTA is greater than or equal to $TA_d$, and that a connection between the UE and eNB may not be possible if MaxTA is less than $TA_d$. Further, at 365, an UL transmission may be performed from the UE to the eNB.

In an example embodiment, when the TOA method is used for UL channel timing adjustment, an equivalent of the MaxTA index value, or real TA-limited maximal operation range index value may reflect the intended cell operational range. According to an example embodiment, the intended cell operation range may be defined by the operator, or it may be set based on a RACH Preamble format type (FIG. 1). In normal operations, the MaxTA may limit the operational cell size. However, by setting the TOA_Extension to ON, the operator may allow an extended connection range, which may be beneficial in the given operational context. Thus, as illustrated in FIG. 11, the TOA_Extension IE may be used for controlling the range for the UE connection.

With respect to the activity diagram illustrated in FIG. 11(a), if the TOA_Extension is set to OFF, or the proposed functionality is not supported by the eNB, the UE may not be allowed to request for radio resources beyond MaxTA-limited cell coverage. Further, if the extended connection range is not supported, the UE may measure $TA_d(T_S)$, (Eq. 4), and check the condition according to Eq. 8.

$$\text{Max } TA \geq TA_d(T_S) \qquad\qquad \text{(Eq. 8)}$$

In Eq. 8, if the condition is not met, for example, if the UE is beyond the indicated maximum cell range and TOA_Extension is set to OFF, the UE may not be allowed to establish a connection. However, if the UE is in RRC connected state, handover may be initiated. In addition, the operator may allow the UE to continue the connection using the TOA method for UL channel timing adjustment.

In another example embodiment, TOA_Extension may be assumed to be set to ON. In this case, if $dTA_d(T_S)$, (Eq. 7), has value higher than 0, it may indicate that the UE is beyond the cell maximum range. Otherwise, it may be set to 0, which means there is no additional timing advance.

According to certain example embodiments, the maximum cell range and associated maximum TA index value, MaxTA, may be determined based on the RACH Preamble format. According to an example embodiment, the RACH Preamble format may be defined by the eNB and provided in SIB1 and SIB2 broadcasts. Further, the UE may determine which preamble format should be used based on FIGS. 1 and 2.

In an example embodiment, the maximum RAR TA value may be 1282. Thus, 1282*16*$T_S$=667.66 µs, which may be 100,130 km. In addition, the RAR TA value may define a maximum cell range for RAR TA. According to an example embodiment, correction $T_{TOAEXT}(T_S)$ used in Eq. 6(a) for extended range connection handling may be calculated with Eq. 9, and may have an index value character.

$$T_{TOAEXT}(T_S) = TA_d(T_S) - \text{Max } TA \quad \text{(Eq. 9)}$$

In Eq. 9, $T_{TOAEXT}(T_S)$ represents the required correction for an UL channel timing adjustment for a UE outside the TA-limited cell range. Further, $TA_d(T_S)$ represents the TOA-based equivalent of the TA index value (Eq. 4). In addition, MaxTA is the maximum TA index value corresponding to the TA-limited maximum cell range, and $T_S$ corresponds to a basic time unit, which measurement defines accuracy.

According to an example embodiment, due to the MAC CE TA update timing adjustment mechanism of Eq. 2, the UE that is in an RRC CONNECTED state may set the maximum cell range defined by TA since the UL channel synchronization may still be maintained. However, in another example, when the UE reaches the maximum possible timing adjustment correction defined by MAC CE TA update, 6-bits, RACH procedure may be initiated to restore synchronization via connection re-establishment. Further, once the UE is beyond the TA-limited range, a connection may not be restored to this eNB and may therefore be lost.

In an example embodiment, for a UE in RRC IDLE state that is beyond the TA-limited maximum cell range and requests radio resources, by definition, the connection may not be established since the RACH Preamble sent by the UE may overlap the next subframe and may not be corrected and detected. In another example embodiment, for a UE staying in an RRC IDLE state, there may be no need for performing measurements or calculations. However, in an example embodiment, such activities may be performed in case the UE requests access to the mobile network. Then, based on the measurements and calculations, a best candidate may be selected, particularly when there is no good cell coverage.

According to an example embodiment, with respect to the activity diagram illustrated in FIG. 11(b), if the TOA_Extension is set to OFF or the proposed functionality is not supported by the eNB, the UE may not be allowed to request for radio resources beyond the TA-limited cell coverage. This may also be true even if the TOA method enables the UE.

According to another example embodiment, TOA-Extension may be set to ON. When comparing $TA_d(T_S)$ (Eq. 4) with MaxTA, Eq. 8 may be obtained. Alternatively, if Eq. 9 has a negative or 0 value, it means that the UE may be inside the given cell range. Thus, no UL TOA-based timing adjustment correction may be needed. Accordingly, $T_{TOAEXT}(T_S)$ (Eq. 9) value may be set to 0. Further timing adjustment may be TA-based.

In an example embodiment, when comparing $TA_d(T_S)$ (Eq. 4) with MaxTA, Eq. 10 may be obtained as follows.

$$\text{Max } TA < TA_d(T_S) \quad \text{(Eq. 10)}$$

Alternatively, if Eq. 9 has a positive value, it means that the UE may be outside the given cell range. Thus, a TOA-based UL timing adjustment correction may be needed. In one example embodiment, the value of the TOA-based UL timing adjustment correction may be calculated via Eq. 11 shown below.

$$N_{TA,TOAEXT,RACH}(T_S) = T_{TOAEXT}(T_S) * 16 * T_S \quad \text{(Eq. 11)}$$

In Eq. 11, $T_{TOAEXT}(T_S)$ represents a TOA-based index value for the RACH Preamble for a UE outside the TA-limited cell range. In addition, $N_{TA,TOAEXT,RACH}(T_S)$ corresponds to an UL channel timing adjustment supporting extended connection range, and $T_S$ is a basic time unit, which measurement defines accuracy. Further, in an example embodiment, the UE may be detected at the end (or near the end—subject of static additional timing advance shift) of a cell maximum coverage, as illustrated in FIG. 10(b).

As an illustrative example according to one embodiment, with respect to the scenario illustrated in FIG. 9 and the activity diagram of FIG. 11(b), a maximum cell range may be defined by a TA maximum value. The TA maximum value may be 1,282 (667.66 µs) (FIG. 1), which corresponds to a distance rounded to 100 km (1,282*78 m). Further, UE2 may be located at a distance of 93.6 km (1,200*78 m), and is within the cell coverage. In addition, UE3 may be at a distance of 109.2 km (1,400*78 m), which is 729.11 µs, and is outside the given cell coverage (FIG. 1).

In another example embodiment, for exemplary data, MaxTA may be equal to 1,282. In addition, for UE2, $TA_d(T_S)$ may be equal 1,200 (assuming TOA accuracy is equal TA accuracy). Further, for UE3, $TA_d(T_S)$ may be equal 1,400 (assuming TOA accuracy is equal TA accuracy). Based on Eq. 9, for UE2, $T_{TOAEXT}(T_S)=1,200-1,282=-82$, which is <0, which means that $T_{TOAEXT}(T_S)=0$ in Eq. 6a. Further, there is no change in the UL to DL channel timing adjustment both for RACH Preamble and for maintaining the connection. In addition, reception of the DL frame may be used as a reference.

According to an example embodiment, for UE3, $T_{TOAEXT}(T_S)=1,400-1,282=118$, which is >0. This means that $T_{TOAEXT}(T_S)=118$ in Eq. 6a, and that there is change in the UL to DL channel timing adjustment with respect to FIG. 8 and the reference DL frame. Based on Eq. 6a, for connection maintaining (RRC CONNECTED), the UL channel timing adjustment may be equal to:

$$UE3: N_{TA,TOAEXT}(T_S) = (1,282+118) * 16 * T_S$$

According to an example embodiment, for the RACH Preamble (transition from RRC IDLE to RRC CONNECTED), based on Eq. 11, the initial UL channel timing adjustment, with respect to the reference DL frame, FIG. 8 may be equal to:

$$UE3: N_{TA,TOAEXT,RACH}(T_S) = 118 * 16 * T_S$$

Figure 12A:
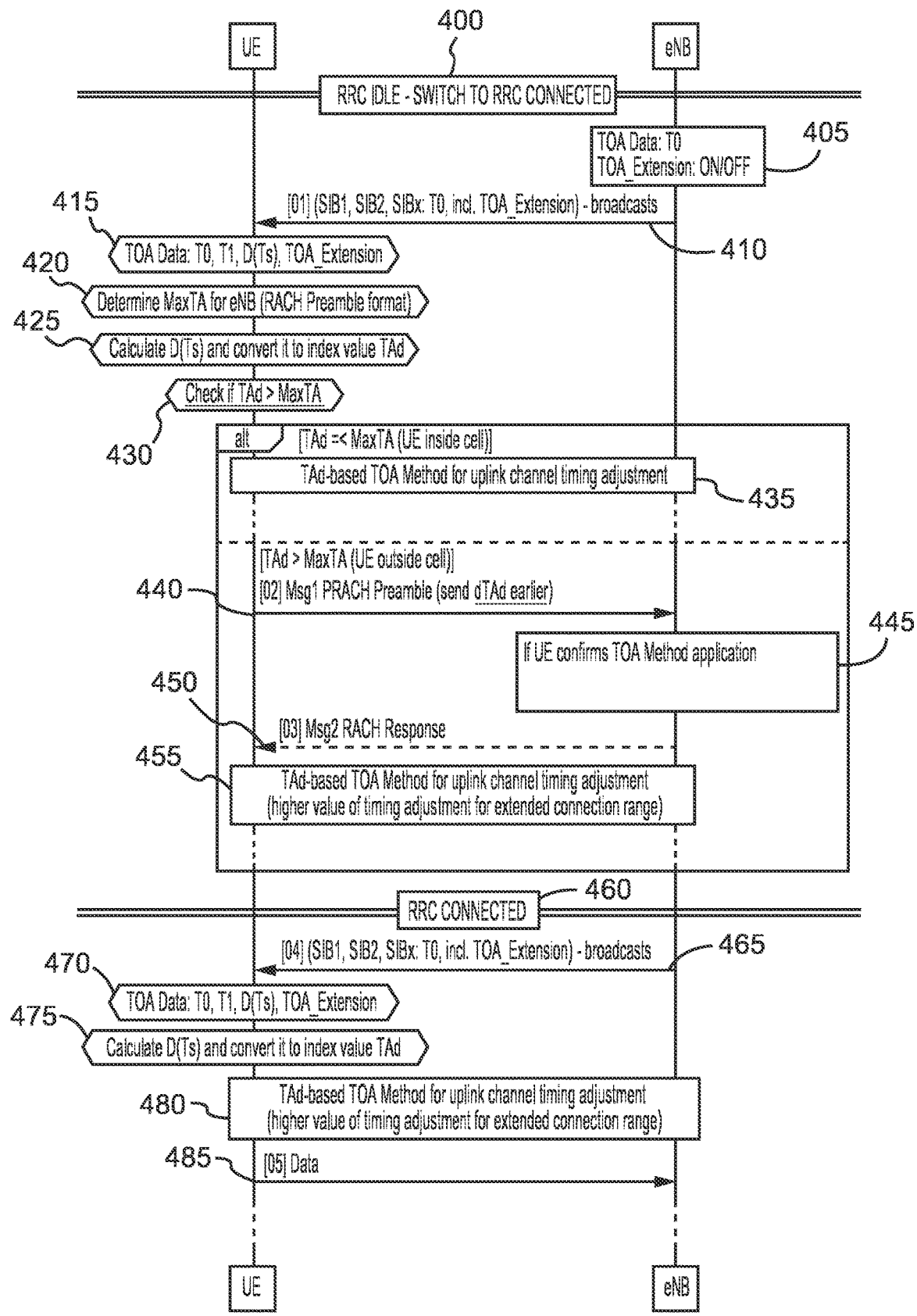
FIG. 12(a) illustrates a signaling diagram for an application of extended range connection during an eNB unaware state, according to an example embodiment.
Figure 12B:
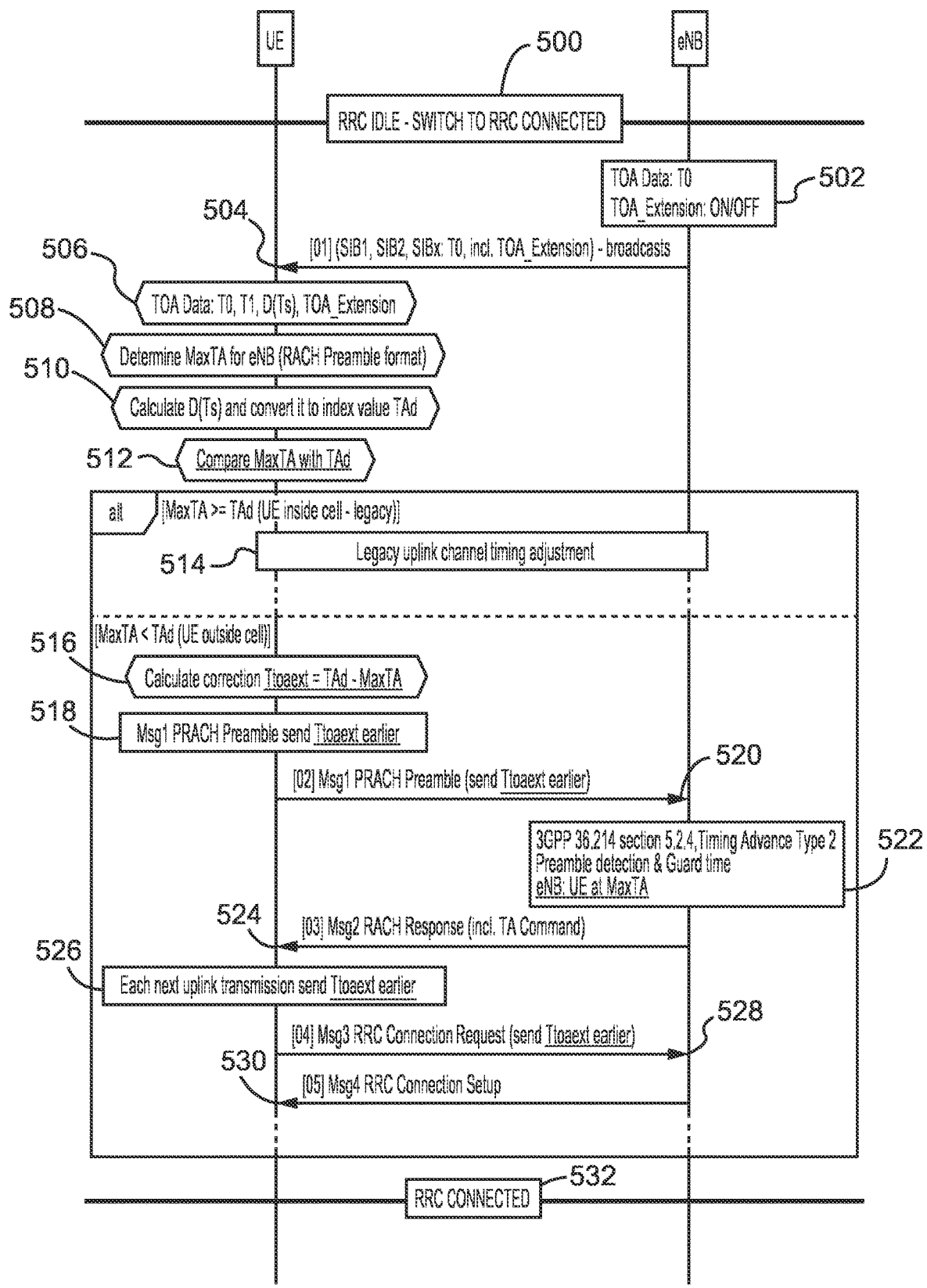
FIG. 12(b) illustrates another signaling diagram for an application of extended range connection during an eNB unaware state, according to another example embodiment.

FIG. 12(a) illustrates a signaling diagram for an application of extended range connection during an eNB unaware state, according to an example embodiment. As illustrated in FIG. 12(a), the eNB may allow for TOA-based establishing and maintaining an extended range connection. However, in such a case, the UE may not be able to inform the eNB about its extended connection range conditions. Further, FIG. 12(b) illustrates another signaling diagram for an application of extended range connection during an eNB unaware state, according to another example embodiment.

As illustrated in FIG. 12(a), at 400, the UE may switch from an RRC IDLE state to an RRC CONNECTED state. At 405, the eNB may obtain TOA data that may include TOA_Extension ON/OFF information. Further, at 410, the eNB may send a signal to the UE. In an example embodiment, the signal may include SIB1, SIB2, SIBx: T0, which may further include the TOA_Extension. At 415, the UE may receive the TOA data from the eNB, and at 420, the UE may determine a MaxTA for the eNB (RACH Preamble format) based on the TOA data. In addition, at 425, the UE may calculate $D(T_s)$ and convert it to an index value of $TA_d$. Further, at 430, the UE may check if $TA_d$ is greater than MaxTA. If $TA_d$ is less than or equal to MaxTA, then, it may be determined that the UE may be inside the cell. As such, at 435, a $TA_d$-based TOA method for UL channel timing adjustment may be performed between the UE and eNB.

If it is determined that $TA_d$ is greater than MaxTA, then, it may be determined that the UE is outside the cell. As such, at 440, the UE may send Msg1 (including the PRACH Preamble) at a time $dTA_d$ earlier to the eNB. At 445, if the UE confirms the TOA method application, then, at 450, the eNB may send Msg2 to the UE that includes a RACH Response. In an example embodiment, if step 445 is applied, then a given message described in 3GPP 36.214 section 5.2.4, Timing Advance Type 2 Preamble detection and guard time may not be required. At 455, a $TA_d$-based TOA method for UL channel timing adjustment may be performed between the UE and eNB (higher value of timing adjustment for extended connection range).

Figure 12B:
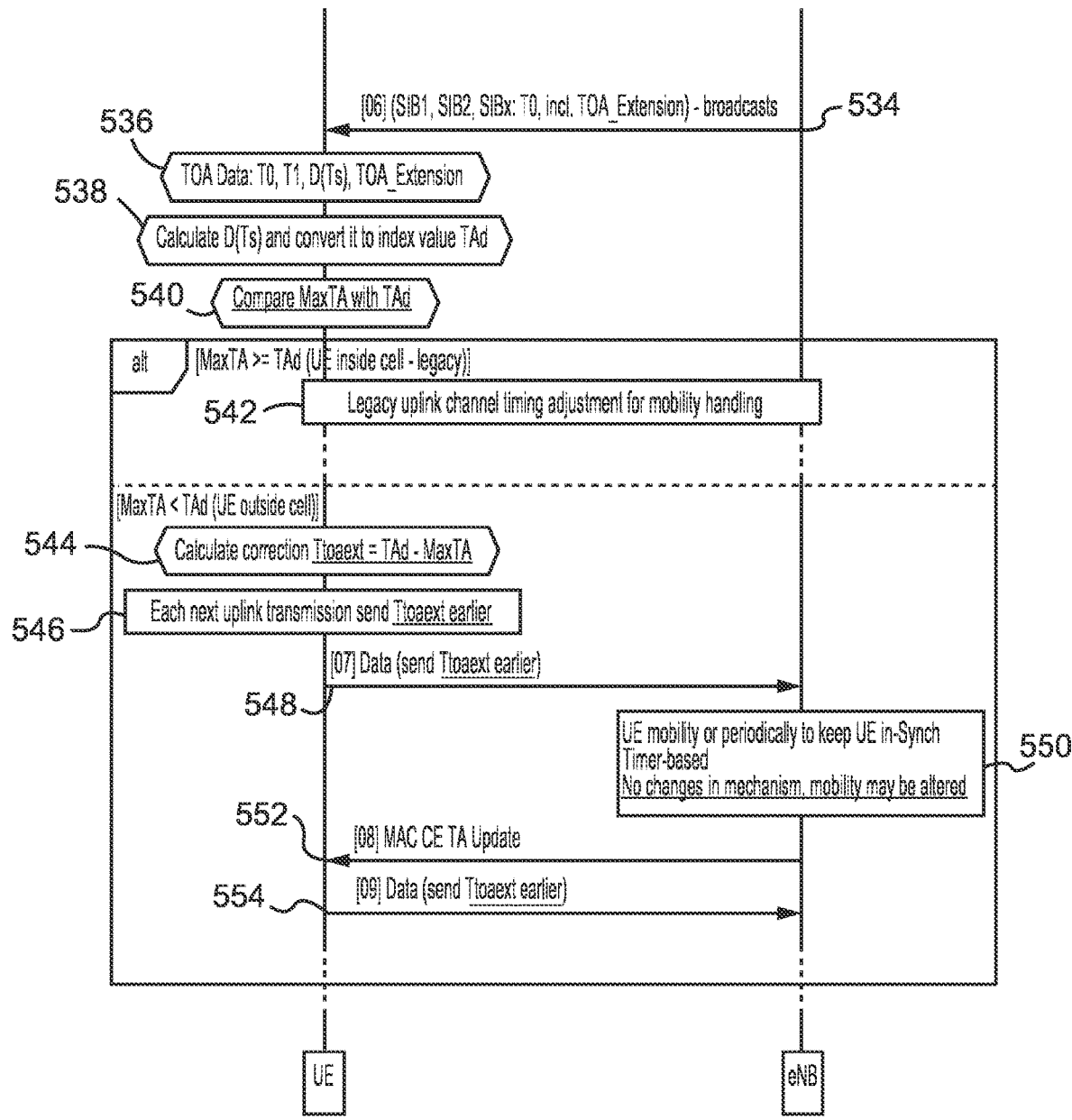

Additionally, FIG. 12(*a*) illustrates at 460 that the UE may be in an RRC CONNECTED state. While in the RRC CONNECTED state, the eNB may at 465, send a signal to the UE. In an example embodiment, the signal may include SIB1, SIB2, SIBx: T0, which may also include the TOA_Extension information. At 470, the UE may receive the TOA data from the eNB, and at 475, calculate $D(T_S)$ and convert it to the index value $TA_d$. Further, at 480, a $TA_d$-based TOA method for UL channel timing adjustment may be performed between the UE and eNB. In addition, at 485, the UE may send data to the eNB, which may include UL channel timing adjustment with $TA_d(T_S)$.

As illustrated in FIG. 12(*b*), at 500, the UE may switch from an RRC IDLE state to an RRC CONNECTED state. At 502, the eNB may obtain TOA data that may include TOA_Extension ON/OFF information. Further, at 504, the eNB may send a signal to the UE. In an example embodiment, the signal may include SIB1, SIB2, SIBx: T0, which may further include the TOA_Extension. At 506, the UE may receive the TOA data from the eNB, and at 508, the UE may determine a MaxTA for the eNB (RACH Preamble format) based on the TOA data. In addition, at 510, the UE may calculate $D(T_S)$, and convert it to index value $TA_d$. Further, at 512, the UE may compare the MaxTA with $TA_d$. If it is determined that the MaxTA is greater than or equal to $TA_d$, it may be determined that the UE is inside the cell. In addition, if the UE is determined to be inside the cell, then at 514, the legacy UL channel timing adjustment may be applied between the UE and eNB.

However, if it s determined that MaxTA is less than $TA_d$, then it may be determined that the UE is outside the cell. In this case, at 516, the UE may calculate a TOA-based correction index value, and at 518 and 520, send a PRACH Preamble with the TOA-based correction index value to the eNB. However, in other example embodiments, the TOA-based correction index value may be included in the following UL transmission such as, for example, Msg3 or even later. According to an example embodiment, the PRACH Preamble may be sent earlier. At 522, the eNB may detect the preamble and a guard time of the PRACH Preamble. Further, at 524, the eNB may send a response message to the UE that includes a TA command. At 526, the UE may send the TOA-based correction index value earlier at each next UL transmission.

As further illustrated in FIG. 12(*b*), at 528, the UE may send a message to the eNB including an RRC CONNECTION request, after which at 530, and 532, the eNB may setup an RRC connection with the UE. Additionally, at 534, the eNB may send another signal to the UE. In an example embodiment, the signal may include SIB1, SIB2, SIBx: T0, which may further include the TOA_Extension. Further, steps 536, 538, and 540 may be similar to those of steps 506, 510, and 512 above. If it is determined that the MaxTA is greater than or equal to $TA_d$, then it may be determined that the UE is inside the cell. As such, at 542, legacy UL channel timing adjustments for mobility handling may be initiated. However, if it is determined that MaxTA is less than $TA_d$, at 544, the UE may calculate a TOA-based correction index value. In addition, at 546, the UE may send the TOA-based correction index value earlier at each next UL transmission. Further, at 548, the UE may send the TOA-based correction index value earlier, and at 550, the eNB may keep the UE in-synch. At 552, the eNB may send a MAC CE TA update to the UE, and at 554, the UE may send data including the TOA-based correction index value earlier to the eNB.

Figure 13A:
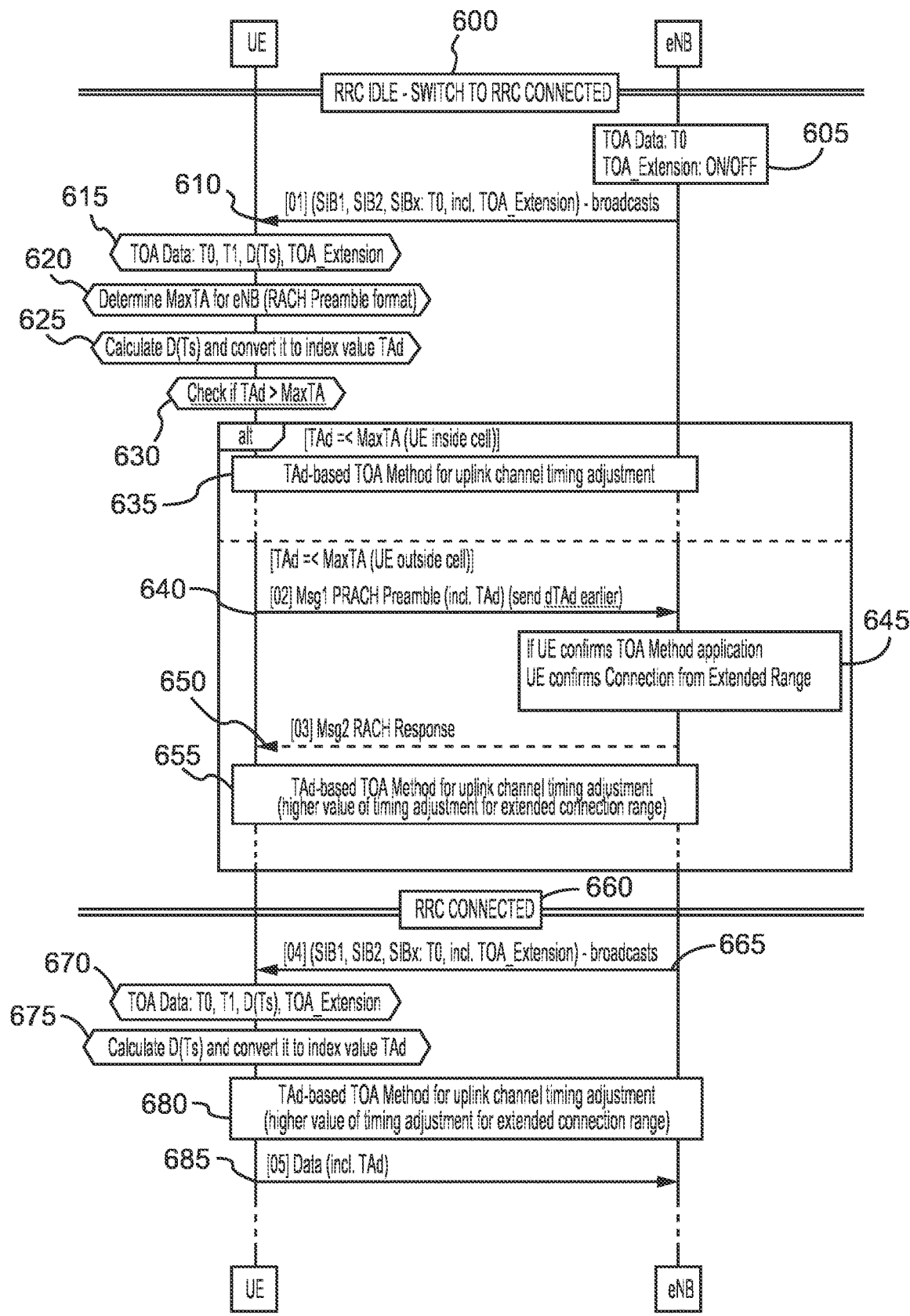
FIG. 13(a) illustrates a signaling diagram for an application of extended range connection during an eNB aware state, according to an example embodiment.
Figure 13B:
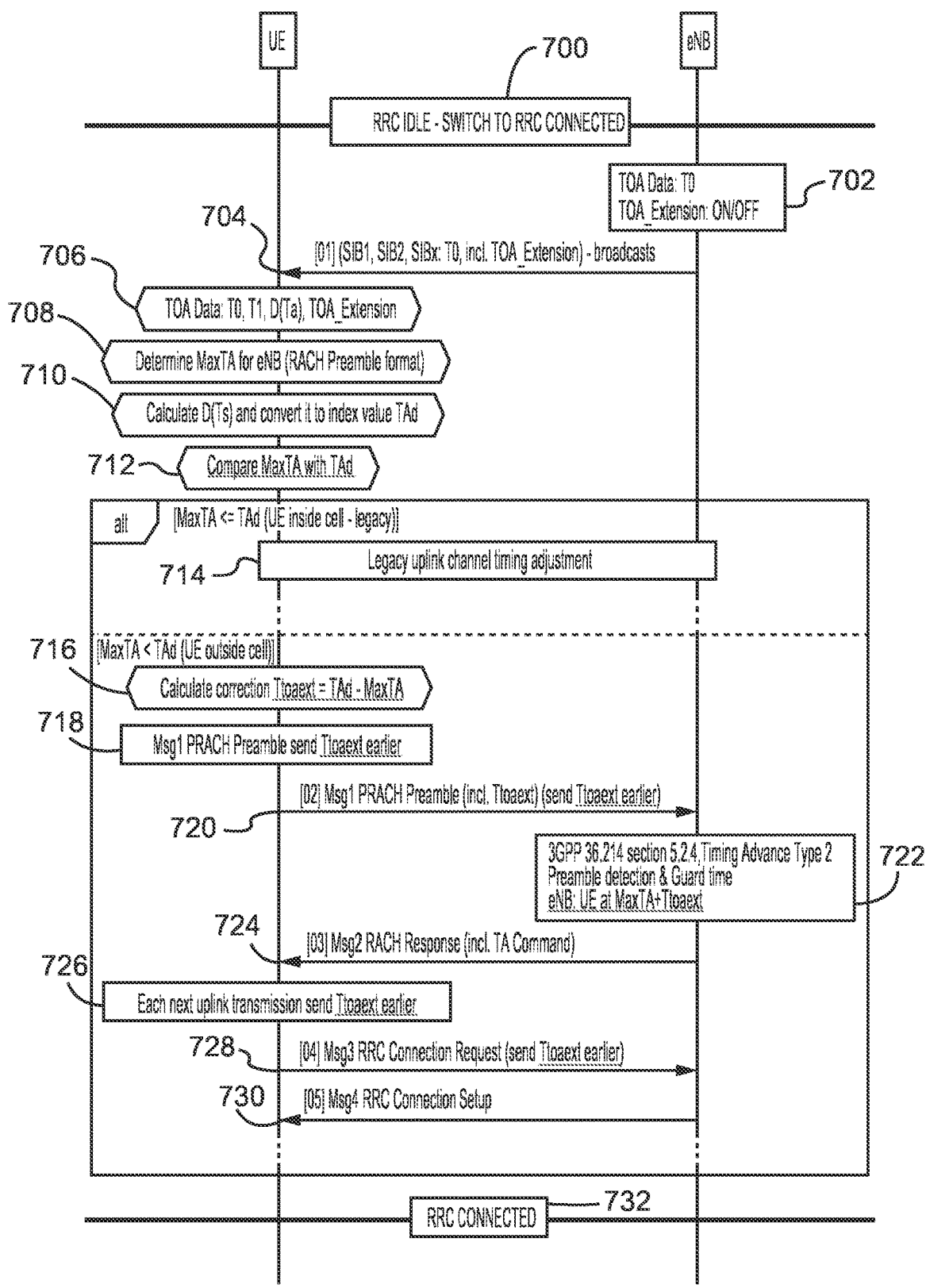
FIG. 13(b) illustrates another signaling diagram for an application of extended range connection during an eNB aware state, according to another example embodiment.
Figure 13B:
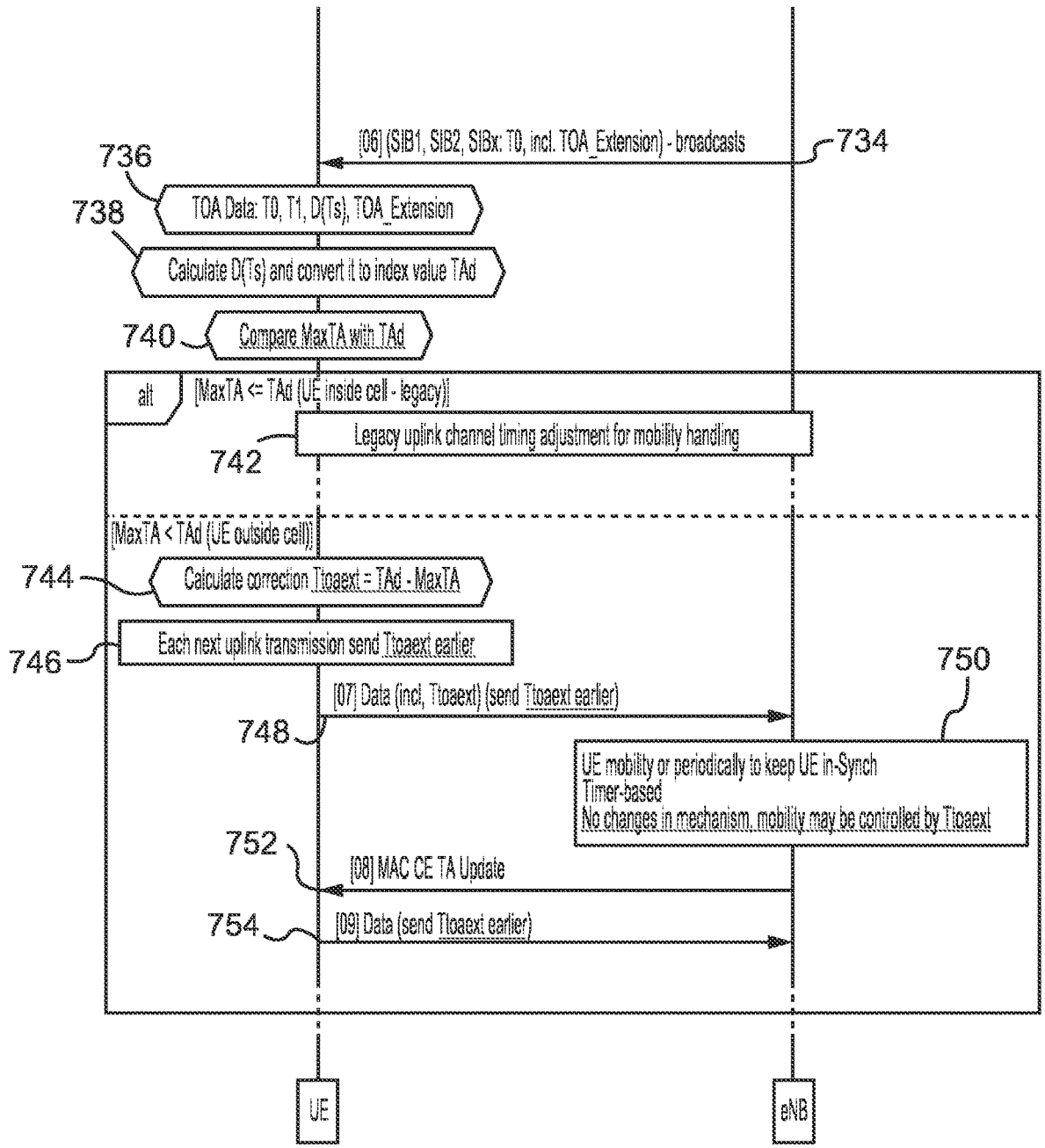

FIG. 13(*a*) illustrates a signaling diagram for an application of extended range connection during an eNB aware state, according to an example embodiment. For instance, as illustrated in FIG. 13(*a*), the eNB may allow for TOA-based establishing and maintaining an extended connection range. In addition, the UE may inform the eNB about its extended connection range conditions by provisioning $dTA_d(T_S)$ (Eq. 7), or $TA_d(T_S)$ (Eq. 4) values in the UL transmission. In an example embodiment, the first possible UL transmission with these data may be a RACH Preamble or other messages during the RACH procedure. Further, FIG. 13(*b*) illustrates another signaling diagram for an application of extended range connection during an eNB aware state, according to another example embodiment.

As illustrated in FIG. 13(*a*), at 600, the UE may switch from an RRC IDLE state to an RRC CONNECTED state. At 605, the eNB may obtain TOA data that may include TOA_Extension ON/OFF information. Further, at 610, the eNB may send a signal to the UE. In an example embodiment, the signal may include SIB1, SIB2, SIBx: T0, which may further include the TOA_Extension. At 615, the UE may receive the TOA data from the eNB, and at 620, the UE may determine a MaxTA for the eNB (RACH Preamble format) based on the TOA data. In addition, at 625, the UE may calculate $D(T_s)$ and convert it to an index value of $TA_d$. Further, at 630, the UE may check if $TA_d$ is greater than MaxTA. If $TA_d$ is less than or equal to MaxTA, then, it may be determined that the UE may be inside the cell. As such, at 635, a TAd-based TOA method for UL channel timing adjustment may be performed between the UE and eNB.

If it is determined that $TA_d$ is greater than MaxTA, then, it may be determined that the UE is outside the cell. As such, at 640, the UE may send Msg1 (including the PRACH Preamble) at a time $dTA_d$ earlier to the eNB. At 645, if the UE confirms the TOA method application, then, at 650, the eNB may send Msg2 to the UE that includes a RACH Response. In an example embodiment, if step 645 is applied, then a given message described in 3GPP 36.214 section 5.2.4, Timing Advance Type 2 Preamble detection and guard time may not be required. At 655, a $TA_d$-based TOA method for UL channel timing adjustment may be performed between the UE and eNB (higher value of timing adjustment for extended connection range).

Additionally, FIG. 13(*a*) illustrates at 660 that the UE may be in an RRC CONNECTED state. While in the RRC CONNECTED state, the eNB may at 665, send a signal to the UE. In an example embodiment, the signal may include SIB1, SIB2, SIBx: T0, which may also include the TOA_Extension information. At 670, the UE may receive the TOA data from the eNB, and at 675, calculate $D(T_S)$ and convert it to the index value $TA_d$. Further, at 680, a $TA_d$-based TOA method for UL channel timing adjustment may be performed between the UE and eNB. In addition, at 685, the UE may send data to the eNB, which may include $TA_d$.

As illustrated in FIG. 13(*b*), at 700, the UE may switch from an RRC IDLE state to an RRC CONNECTED state. At 702, the eNB may obtain TOA data that may include TOA_Extension ON/OFF information. Further, at 704, the eNB may send a signal to the UE. In an example embodiment, the signal may include SIB1, SIB2, SIBx: T0, which may further include the TOA_Extension. At 706, the UE may receive the TOA data from the eNB, and at 708, the UE may determine a MaxTA for the eNB (RACH Preamble format) based on the TOA data. In addition, at 710, the UE may calculate $D(T_S)$, and convert it to index value $TA_d$. Further, at 712, the UE may compare the MaxTA with $TA_d$. If it is determined that the MaxTA is greater than or equal to $TA_d$, it may be determined that the UE is inside the cell. In addition, if the UE is determined to be inside the cell, then at 714, the legacy UL channel timing adjustment may be applied between the UE and eNB.

However, if it is determined that MaxTA is less than $TA_d$, then it may be determined that the UE is outside the cell. In this case, at 716, the UE may calculate a TOA-based correction index value, and at 718 and 720, send a PRACH Preamble with the TOA-based correction index value to the eNB. According to an example embodiment, the PRACH Preamble may be sent earlier, and may include the TOA-based correction index value. At 722, the eNB may detect the preamble and a guard time of the PRACH Preamble. Further, at 724, the eNB may send a response message to the UE that includes a TA command. At 726, the UE may send the TOA-based correction index value earlier at each next UL transmission.

As further illustrated in FIG. 13(*b*), at 728, the UE may send a message to the eNB including an RRC CONNECTION request, after which at 730, and 732, the eNB may setup an RRC connection with the UE. Additionally, at 734, the eNB may send another signal to the UE. In an example embodiment, the signal may include SIB1, SIB2, SIBx: T0, which may further include the TOA_Extension. Further, steps 736, 738, and 740 may be similar to those of steps 706, 710, and 712 above. If it is determined that the MaxTA is greater than or equal to $TA_d$, then it may be determined that the UE is inside the cell. As such, at 742, legacy UL channel timing adjustments for mobility handling may be initiated. However, if it is determined that MaxTA is less than $TA_d$, at 744, the UE may calculate a TOA-based correction index value. In addition, at 746, the UE may send the TOA-based correction index value earlier at each next UL transmission. Further, at 748, the UE may send the TOA-based correction index value earlier, and at 750, the eNB may keep the UE in-synch. At 752, the eNB may send a MAC CE TA update to the UE, and at 754, the UE may send data including the TOA-based correction index value earlier to the eNB.

According to an example, embodiment, in both FIGS. 12(*a*) and 13(*a*), it may be assumed that the eNB may fully support the TOA method for UL channel timing adjustment, and TA command or MAC CE TA update may not be needed, or if present, they may be omitted by the UE. A difference between the embodiment illustrated in FIG. 12(*a*) and the embodiment illustrated in FIG. 13(*a*) is that the UE may report extended connection range conditions, which may be used for eNB performance optimization. In an example embodiment, the UE may be located at the edge of coverage (UE3, FIG. 10(*a*)) if the eNB requests TA measurement. According to an example embodiment illustrated in FIG. 13(*a*), information about the extended connection condition may be used for further performance optimization, and the eNB may be able to properly assess the UE distance. Further, in an example embodiment, based on $dTA_d(T_S)$ (Eq. 7), or $TA_d(T_S)$ (Eq. 4) value index, the eNB may apply additional filtering or use different settings for such connection if needed.

According to certain example embodiments, a RACH Preamble may be provided for extended range connection. For example, if $dTA_d(T_S)$ (Eq. 7), index value indicates extended connection range condition ($dTA_d(T_S)>0$) and TOA_Extension is set to ON, if the UE initiates a RACH Preamble procedure, the RACH Preamble may be sent with initial UL channel timing adjustment as specified in (Eq. 6b) with respect to a reference DL frame, as illustrated on FIG. 8. In this case, the RACH Preamble may reach the indicated subframe designed for the hearing window, and may be detected at the end (or near the end—subject of additional timing advance static shift), as illustrated on FIG. 10(*a*) for UE3. In an example embodiment, this may be intentional as in this case where the eNB may set an adequate signal power level and other performance parameters for cell edge conditions.

In an example embodiment, with respect to FIGS. 9 and 11(*a*), the maximum cell range may be defined by a TA maximum value (or by an operator), such as, for example, 1,282 (667.66 μs) (FIG. 1). The maximum TA value may correspond to a distance rounded to 100 km (1,282*78 m). Further, UE2 may be at a distance of 93.6 km (1,200*78 m), which may be within the cell coverage. In addition, UE3 may be positioned at a distance of 109.2 km (1,400*78 m), which is 729.11 μs, and is outside the given cell coverage according to FIG. 1. Here, the TOA-based timing advance may exceed the nominal TA value.

According to certain example embodiments, MaxTA may be set to 1,282. For UE2, $TA_d(T_S)$ may be equal 1,200, and for UE3, $TA_d(T_S)$ may be equal 1,400. Based on Eq. 7, the TOA-based index value for the first UL channel timing adjustment for the extended connection range $dTA_d(T_S)$ for UE2 may be as follows: $dTA_d(T_S)=1,200-1,282=-82$, which is <0, which means $dTA_d(T_S)=0$ and the UE is within cell nominal range. As for UE3, $dTA_d(T_S)$ may be as follows: $dTA_d(T_S)=1,400-1,282=118$, which is >0, which means $dTA_d(T_S)=118$ and the UE is outside cell nominal range, which means extended range connection condition. For both UE2 and UE3, $dTA_d(T_S)$ may be reported to the eNB.

In an example embodiment, for UE2 and UE3 (if TOA-Extension ON) UL channel timing adjustment during RRC CONNECTED state may be provided by Eq. 5. For example, the TOA-based UL channel timing adjustment supporting extended connection range $N_{TA,TAd}(T_S)$ for UE2 and UE3 may be as follows:

$$UE2:N_{TA,TAd}(T_S)=1,200*16*T_S$$

$$UE3:N_{TA,TAd}(T_S)=1,400*16*T_S$$

For UE2, when a condition by Eq. 8 is true, no initial UL channel timing adjustment for RACH Preamble may be needed. Instead, the RACH Preamble may be sent with respect to a reference DL frame, as illustrated in FIG. 10(*a*). For UE3, under an extended connection range condition, the initial UL channel timing adjustment during the RACH Preamble with respect to a reference DL frame, as illustrated in FIG. 10(*a*), may be provided by Eq. 6a as follows:

$$UE3:N_{TA,dTAd,RACH}(T_S)=118*16*T_S$$

According to certain example embodiments, extended range connection handling may be applied in at least two variants, as illustrated in FIGS. 12(*a*) and 13(*a*), which differ with respect to an eNB awareness state. Further, in both variants, the eNB may enable the UE to establish a connection beyond the TA-limited maximum cell (MaxTA) range (TOA_Extension set to ON). In both variants, for RRC IDLE state, the UE may measure propagation delay-based distance (TOA) to the eNBs and estimate MaxTA. However, in certain example embodiments, since no connections are needed, such activity may not be required in RRC IDLE state. Further, in an example embodiment, if a MaxTA and $TA_d(T_S)$ (Eq. 7), comparison indicates that the UE is within the given cell coverage, a TOA-based solution for RRC management may be applied.

According to other example embodiments for the RACH Preamble for extended range connection, to enable successful radio resource access, for UE3 and change its state to RRC CONNECTED, UE3 may send the RACH Preamble 6,145 µs earlier ($T_{TOAEXT}(T_S)$=118), $N_{TA,TOAEXT,RACH}(T_S)$ (Eq. 11) with respect to the timing specified in the RACH Preamble format provided by the eNB in SIB1 and SIB2 for initial access. The RACH Preamble may also be sent with respect to the frame structure defined in FIG. 1 and FIG. 2, and on FIG. 8. According to an example embodiment, this may meant that when UE3 sends the RACH Preamble 6,145 µs earlier, it will reach the eNB within the hearing window, and may be positioned at the edge of cell coverage.

In an example embodiment, the eNB may determine the corresponding TA index value as equal to the maximum allowed TA index value. For instance, in this example, TA=1,282, which may be provided to the UE in a TA command in an RAR message. In a further example embodiment, each following UE3 UL transmission may need to be corrected by $T_{TOAEXT}(T_S)$=118 value, or if distance will change, to an updated $T_{TOAEXT}(T_S)$ value unless a condition defined by Eq. 10 is true. Thus, according to an example embodiment, the TOA-based initial UL channel timing adjustment for the RACH Preamble $N_{TA,TOAEXT,RACH}(T_S)$ for extended connection range set with respect to legacy reference downlink frame, may be equal to Eq. 11. In this example embodiment for Eq. 11, $T_{TOAEXT}(T_S)$ represents a TOA-based correction index value for uplink channel timing adjustment for UE outside TA-limited cell range. In addition, $N_{TA,TOAEXT,RACH}(T_S)$ represents an initial UL channel timing adjustment supporting extended connection range for RACH Preamble, and $T_S$ is a basic time unit, which measurement defines accuracy.

According to an example embodiment, since UE3 may be detected at the edge of coverage, it may be assumed that the eNB may set an adequate power level and throughput to handle such connection without any additional changes in the legacy behavior. Further, in an example embodiment, should the connection be lost, normal handling of such situation may be foreseen by typical radio link failure.

In an example embodiment, with reference to the activity diagram illustrated in FIG. 11(*b*), the extended range connection handling may be applied in two variants as illustrated in FIGS. 12(*b*) and 13(*b*). In both variants, the eNB may enable the UE to establish a connection beyond the TA-limited maximum cell range (TOA_Extension set to ON). Further, in both variants, for RRC IDLE state, the UE may measure propagation delay-based distance (TOA) to the eNBs and estimate MaxTA. However, since no connections are needed, such activity may not be required in the RRC IDLE state. In addition, according to an example embodiment, if MaxTA and $TA_d(T_S)$ comparison indicates that the UE is within the given cell coverage, the legacy solution may be applied as no UL channel TOA-based timing adjustment correction may be needed.

Certain example embodiments may provide an RRC IDLE transition to the RRC CONNECTED state or TA command. For instance, if MaxTA and $TA_d(T_S)$ comparison, (Eq. 6b), indicates that the UE is outside the given cell maximum range, and the UE intends to change its state from RRC IDLE to RRC CONNECTED, the RACH Preamble (message [02] in FIG. 12(*a*) and FIG. 13(*a*)) may be sent with an initial UL channel timing adjustment defined by Eq. 6b. In addition, the RACH Preamble may be sent with respect to the synchronization mechanism based on the reference DL frame illustrated in FIG. 8. Further, the index value $dTA_d(T_S)$ of Eq. 7 may inform the eNB about how much the UE is beyond the cell maximum range.

Additionally, under the RRC IDLE transition to the RRC CONNECTED state, UL transmissions including, for example, message [05] in FIGS. 8 and 9, may be sent with an UL channel timing adjustment defined by Eq. 3, with $TA_d(T_S)$. According to an example embodiment, the provided UL channel timing adjustment may have a higher value with respect to the UL channel timing adjustment for a nominal cell range.

As illustrated in FIG. 12(*a*), the RACH Preamble message [02] may be sent $dTA_d(T_S)$ (Eq. 6b) earlier with respect to FIG. 8. Further, in an example embodiment, there may be no other indication that UE is beyond TA-limited cell maximum range. However, in the case of FIG. 13(*a*), the RACH Preamble message [02] may be sent $dTA_d(T_S)$ (Eq. 6b) earlier, and $TA_d(T_S)$ or $dTA_d(T_S)$ index values may be reported by the UE. Further, in FIG. 13(*a*), message [02] may be the first possible place for provisioning such information to the eNB. However, $TA_d(T_S)/dTA_d(T_S)$ may be also included in the next following UL transmissions, if needed. Additionally, in an example embodiment, provisioning of $TA_d(T_S)$ or $dTA_d(T_S)$ values may inform the eNB that the UE is beyond the TA-limited cell range (MaxTA). Thus, according to certain example embodiments, the eNB may be aware that a connection is requested from beyond the cell range, and may register this information.

In certain example embodiments, the eNB awareness status may have an impact on TA related application and services that use TA information for further processing. In an example embodiment, if the UE does not provide $TA_d(T_S)$ or $dTA_d(T_S)$ information (FIG. 12(*a*)), such services may be inaccurate. However, reporting $TA_d(T_S)$ or $dTA_d(T_S)$ (FIG. 13(*a*)) may not affect its performance.

According to an example embodiment, per cell measurement data (PCMD) reporting may include the same $TA_d(T_S)$ information as for TA. According to another example embodiment, RRC CONNECTION may be established based on the TOA method if other than TA maximum value parameters (i.e., power budge, CQI) allow such connection.

According to other example embodiments, if MaxTA and $TA_d(T_S)$ comparison indicates that the UE is outside the given cell maximum range and the UE intends to change its state from RRC IDLE to RRC CONNECTED, TOA-based $T_{TOAEXT}(T_S)$ correction in Eq. 6a may be needed. In an example embodiment, the UE may apply a TOA-based UL channel timing adjustment correction for the RACH Preamble (the first UL message) [02] in FIG. 12(*b*) and FIG. 13(*b*). In an example embodiment, the RACH Preamble may be sent $T_{TOAEXT}(T_S)$ (Eq. 9) earlier than as indicated in the frame structure data broadcasted by the eNB in SIB1 and SIB2 (FIGS. 1 and 2), and with respect to FIG. 8. According to an example embodiment, as the PSS/SSS mechanism is used for synchronization, the UE may apply necessary additional timing adjustments to ensure that this UL transmission reaches hearing window size.

In an example embodiment, in the case of FIG. 12(b), apart from that RACH Preamble message [02] is sent $T_{TOAEXT}(T_S)$ earlier, there may be no other indication that the UE is beyond TA-limited cell maximum range. This may mean that the eNB may detect this UE at the edge of coverage, but may not be aware that in fact the UE is outside the TA-limited maximum range. In another example embodiment, in the case of FIG. 13(b), the RACH Preamble message [02] may send $T_{TOAEXT}(T_S)$ earlier, and $T_{TOAEXT}(T_S)$ correction may be reported by UE. This may be the first possible place for provisioning such information to the eNB. However, $T_{TOAEXT}(T_S)$ may also be included in the following UL transmissions, if needed. Further, provision of $T_{TOAEXT}(T_S)$ value may inform the eNB that the UE is beyond TA-limited cell range. Thus, the eNB may be aware that a connection is requested from beyond cell range and may register this information.

According to an example embodiment, the eNB awareness status may have an impact on the TA related application and services, which may use TA information for further processing. In an example embodiment, if the UE does not provide $T_{TOAEXT}(T_S)$ information (FIG. 12(b)), such services may be inaccurate, whereas reporting $T_{TOAEXT}(T_S)$ information (FIG. 13(b)) may not affect their performance.

In an example embodiment, Per Call Measurement Data (PCMD) reporting may include $T_{TOAEXT}(T_S)$ information. In a further example embodiment, for FIGS. 12(b) and 13(b), the RRC CONNECTION may be established if other than TA maximum value parameters (i.e., power budget, CQI) allows such connection. In both cases, the TA command provided in the RAR message [3] may not contain $T_{TOAEXT}(T_S)$ correction. This may be that in case of FIG. 13(b), even if the UE informs the eNB about the extended connection range, the allowed legacy TA index value range may not support higher values.

According to an example embodiment, each next UE transmission (e.g. [04]) may send $T_{TOAEXT}(T_S)$ earlier if the condition Eq. 10 is true. This may mean that the UE is outside the TA-limited cell range. Further, this additional timing advance may correspond to a longer UE distance from the eNB, which may require an additional timing advance compensation. In an example embodiment, correction $T_{TOAEXT}(T_S)$ may be proportional to the UE relative distance to the eNB when both the UE and the eNB are in motion, including in Non Terrestrial Network (NTN) applications.

Certain example embodiments may provide an RRC CONNECTED state or MAC CE TA update. For instance, once the UE is in an RRC CONNECTED state beyond the TA-limited range, UL channel timing adjustments may be provided by Eq. 5, with $TA_d(T_S)$. In an example embodiment, $N_{TA,TAd}(T_S)$ may have a higher value with respect to maximum timing advance correction for TA-limited maximum cell range. Further, for extended range connection, $TA_d(T_S)$ may be included in the UL transmission, as shown in FIG. 13(a). Alternatively, $TA_d(T_S)$ may not be provided, as shown in FIG. 12(b).

According to an example embodiment, if the UE is in an RRC CONNECTED state beyond the TA-limited range, each UL transmission may be sent $T_{TOAEXT}(T_S)$ earlier, as it corresponds to the distance. Further, according to another example embodiment, once the UE is in RRC CONNECTED state and enters nominal cell range where the TA index value range is supported, $T_{TOAEXT}(T_S)$ may be set to 0 and connection may be continued. Further, the next UE UL transmission may not be $T_{TOAEXT}(T_S)$ corrected, which may correspond to is smooth UE extended-nominal distance change handling.

In an example embodiment, if the UE is in the RRC CONNECTED state and leaves the TA-supported cell range, adequate $T_{TOAEXT}(T_S)$ timing correction may be added to each UL transmissions in a smooth way. In addition, according to another example embodiment, the MAC CE TA update mechanism for UE mobility handling may remain unchanged. In an example embodiment, considering MAC CE TA update 6-bits application range and TOA-based $TA_d(T_S)$ granularity, it may be assumed that beyond cell range synchronization may be provided by $T_{TOAEXT}(T_S)$ (Eq. 9) correction calculation.

According to an example embodiment, once TOA-based measurements indicate change in $TA_d(T_S)$, which may be equivalent to $1T_A$ (LTE: 78 m), a new $T_{TOAEXT}(T_S)$ correction may be used as $T_{TOAEXT}(T_S)$ and applied in Eq. 6a. This way, even for a TA-based UE, TOA correction may be used for synchronization. It may also mean that there may be no need to perform reestablishment when MAC CE TA update correction reaches the maximum 6-bits range (0, . . . , 63) as $T_{TOAEXT}(T_S)$ provides the necessary timing adjustment.

In an example embodiment, MAC CE TA update may not be required for mobility handling beyond the TA-limited cell range (but does apply for timer-based application) as changes in UE mobility may be fully covered by $T_{TOAEXT}(T_S)$. This means that MAC CE TA update may not be triggered by the legacy mechanism since the UE may look as if it is already being synchronized. A reason for MAC CE TA update sending may be a timer-based update criterion.

According to an example embodiment as illustrated in FIG. 13(b) for an extended connection range condition, the provided $T_{TOAEXT}(T_S)$ index value may not be added to a TA command in RAR. However, it may be applied directly by the UE. This solution may not require modification in the legacy TA calculation on the eNB side. Further, in an example embodiment, the provision of MAC CE TA update mobility correction for extended connection range condition may not be changed by the presence of a $T_{TOAEXT}(T_S)$ index value. However, in an example embodiment, the TOA method may replace the need for such corrections. In case of FIG. 13(b), the eNB may be aware of this fact and may reduce the frequency of MAC CE TA updates.

According to an example embodiment, with regard to NTN extended connection range, a 1 ms microwave signal may travel approximately 300 km (one way), which is more for ground mobile network connections. This may be especially as cell coverage may be limited mainly by radio horizon. However, in NTN applications, depending on certain configurations such as orbit selection, the UE may be at a distance up to 1000 km (FIG. 3). This means that UL transmissions may need to be synchronized to the next #n+x subframe with respect to the DL channel, where #n indicates a consecutive DL subframe number, and x indicates a number of subframes to be delayed, where a propagation distance may be used as a parameter.

In an example embodiment, for the ground network, the UE may receive MAC Ce TA update in #n subframe, and apply TA correction starting from the #n+6 UL subframe. According to an example embodiment, a longer distance may require additional time (in two directions). Thus, for the UE at a distance (e.g., 400 km), a #n+8 pattern may be used. In this context, it may be possible to handle UE in NTN beyond the TA-limited operational range if other parameters still enable a connection. Additionally, in an example embodiment, for NTN, the same $TA_d(T_S)$-based mechanism for extended range connection (Eq. 5 and 6) may be applied as the only change may be the subframe selection of #n+x.

Further, certain example embodiments may be applied for handling the UE at very long distances in NTN applications beyond the TA-limited operational range. For instance, this may occur if other parameters still enable a connection. In addition, according to another example embodiment, for NTN, the same $T_{TOAEXT}(T_S)$-based compensation mechanism for extended range connection (Eq. 6a), may be applied as the only change may be subframe selection #n+x.

Figure 14:
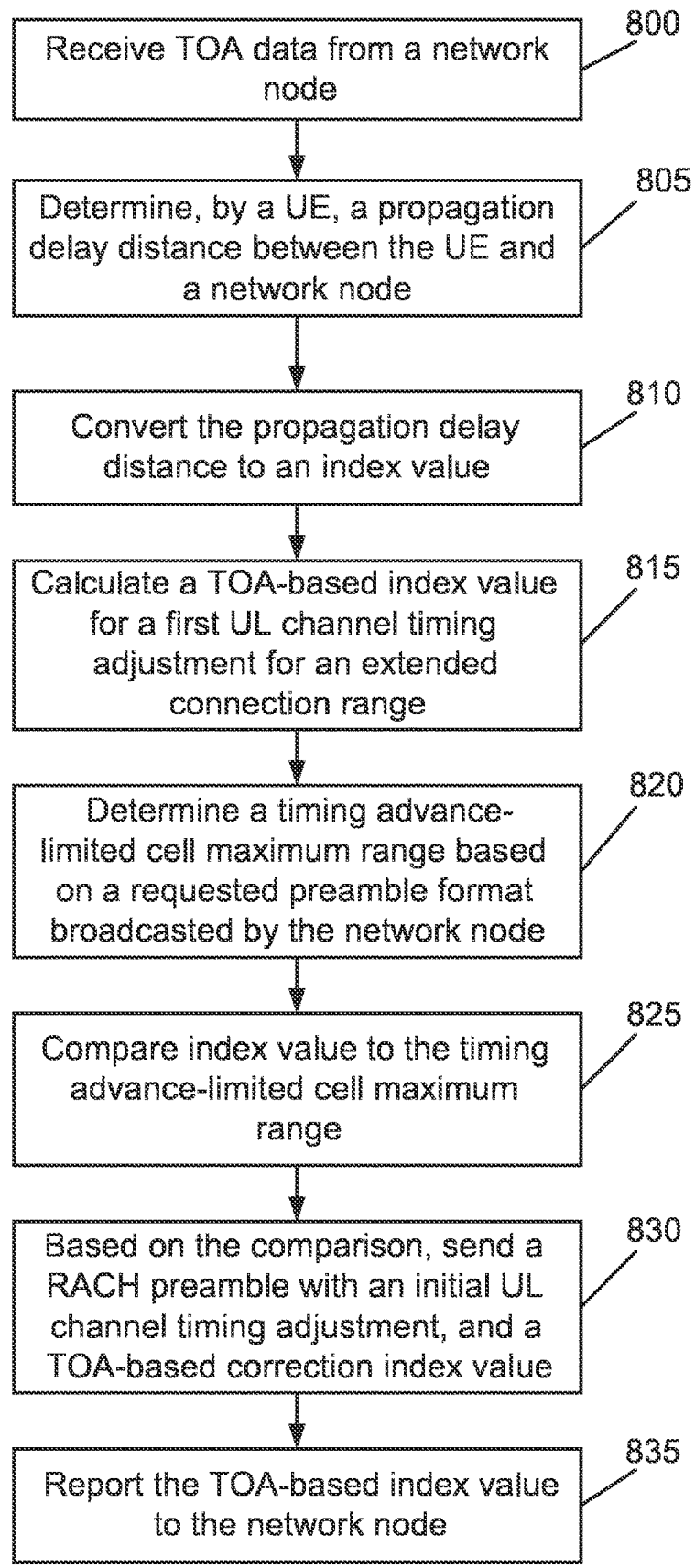
FIG. 14 illustrates a flow diagram of a method, according to an example embodiment.

FIG. 14 illustrates a flow diagram of a method, according to an example embodiment. In certain example embodiments, the flow diagram of FIG. 14 may be performed by a mobile station and/or UE, for instance similar to apparatus 10 illustrated in FIG. 16(a). According to one example embodiment, the method of FIG. 14 may include initially, at 800, receiving TOA data from a network node. The method may also include, at 805, determining, by a UE, a propagation delay distance between the UE and the network node. The method may further include, at 810, converting the propagation delay distance to an index value. In addition, the method may include, at 815, calculating a TOA-based index value for a first UL channel timing adjustment for an extended connection range. Further, the method may include, at 820, determining a TA-limited cell maximum range based on a requested preamble format broadcasted by the network node. The method may also include, at 825, comparing the index value to the timing advance maximum index value. The method may further include, at 830, based on the comparison, sending a RACH Preamble with an initial UL channel timing adjustment to fit an indicated subframe dedicated for a hearing window, and sending a TOA-based correction index value to establish and maintain an extended range connection with the network node. The method may also include at 835, reporting the TOA-based index value to the network node.

According to an example embodiment, the TOA-based index value may include information about how much the UE may be beyond the TA-limited cell maximum range. According to another example embodiment, if the TA-limited cell maximum range is greater than or equal to the time of arrival-based index value, the method further include determining that the UE is inside a cell timing advance-based maximum range. In an example embodiment, if the TA-limited cell maximum range is less than the time of arrival-based index value, the method may further include determining that the UE is outside the TA-based maximum range, and sending the RACH Preamble with the TOA-based index value to the network node. In another example embodiment, if the TA-limited cell maximum range is less than the time of arrival-based index value, the method may further include determining that the user equipment is outside the TA-based maximum range, and sending the random access channel preamble with the time of arrival-based correction index value.

According to an example embodiment, the UE may be in a RRC idle state or a RRC connected state. According to another example embodiment, if the UE is outside a given cell maximum range, and the UE intends to change its state from the RRC idle state to the RRC connected state, the RACH preamble may be sent with an initial UL channel timing adjustment. In an example embodiment, if the UE is outside a given cell maximum range, and the UE intends to change its state from the RRC idle state to the RRC connected state, the TOA-based index value may be sent earlier. In another example embodiment, if the UE is outside the given cell maximum range, and the UE intends to change its state from the RRC idle state to the RRC connected state, the TOA-based correction index value may be sent earlier. In a further example embodiment, if the UE is outside the given cell maximum range, and the UE is in RRC connected state, the TOA-based correction index value may be sent earlier.

Figure 15:
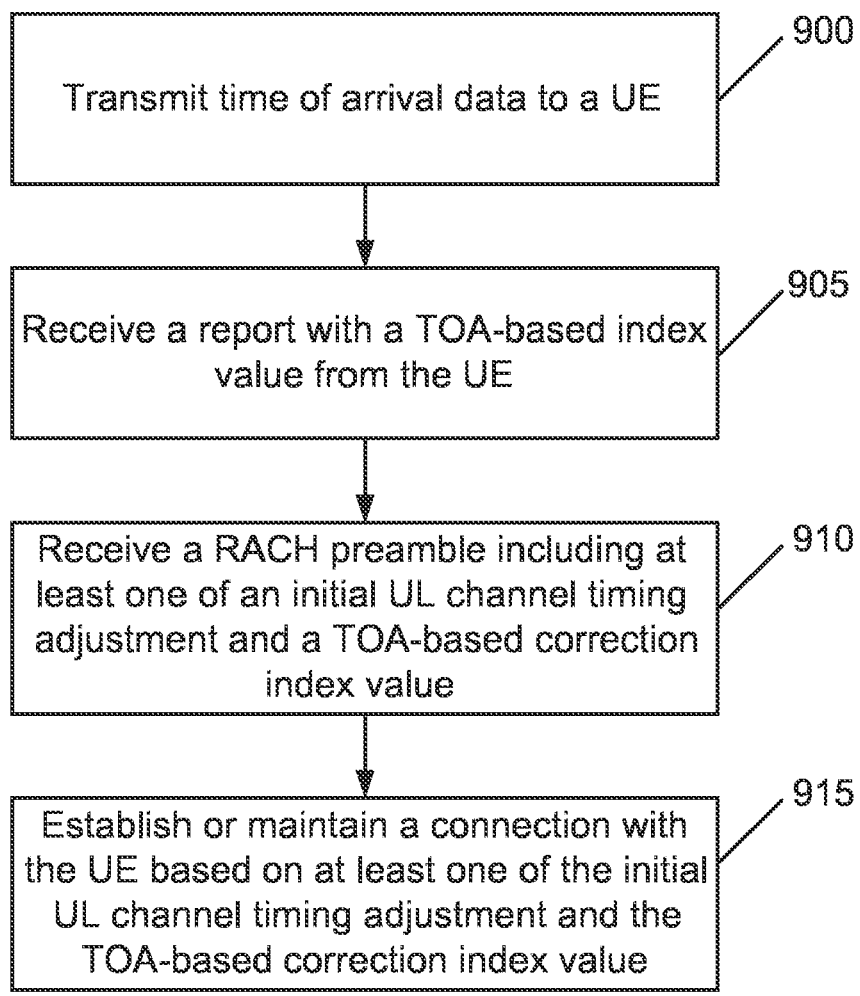
FIG. 15 illustrates a flow diagram of another method, according to an example embodiment.

FIG. 15 illustrates a flow diagram of another method, according to an example embodiment. In an example embodiment, the method of FIG. 15 may be performed by a telecommunications network, network entity or network node in a 3GPP system, such as LTE or 5G-NR. For instance, in an example embodiment, the method of FIG. 15 may be performed by a base station, eNB, or gNB for instance similar to apparatus 20 illustrated in FIG. 16(b).

According to an example embodiment, the method of FIG. 15 may include initially, at 900, transmitting TOA data to a UE. The method may also include, at 905, receiving a report with a TOA-based index value from the UE. The method may further include, at 910, receiving a RACH preamble including at least one of an initial UL channel timing adjustment and a TOA-based correction index value. In addition, the method may include, at 915, establishing or maintaining a connection with the UE based on at least one of the initial UL channel timing adjustment and the TOA-based correction index value.

According to an example embodiment, the TOA-based index value may include information about how much the UE may be beyond a TA-limited cell maximum range. According to another example embodiment, the RACH preamble may be received with the initial UL channel timing adjustment if the UE is outside the given cell maximum range, and the UE intends to change its state from a RRC idle state to a RRC connected state. In an example embodiment, the TOA-based index value may be sent earlier if the UE is outside the given cell maximum range, and the UE intends to change its state from a RRC idle state to a RRC connected state. In another example embodiment, the TOA-based correction index value may be sent earlier if the UE is outside the given cell maximum range, and the UE intends to change its state from a RRC idle state to a RRC connected state. In a further example embodiment, the TOA-based correction index value may be sent earlier if the UE is outside the given cell maximum range, and the UE is in a RRC connected state.

Figure 16A:
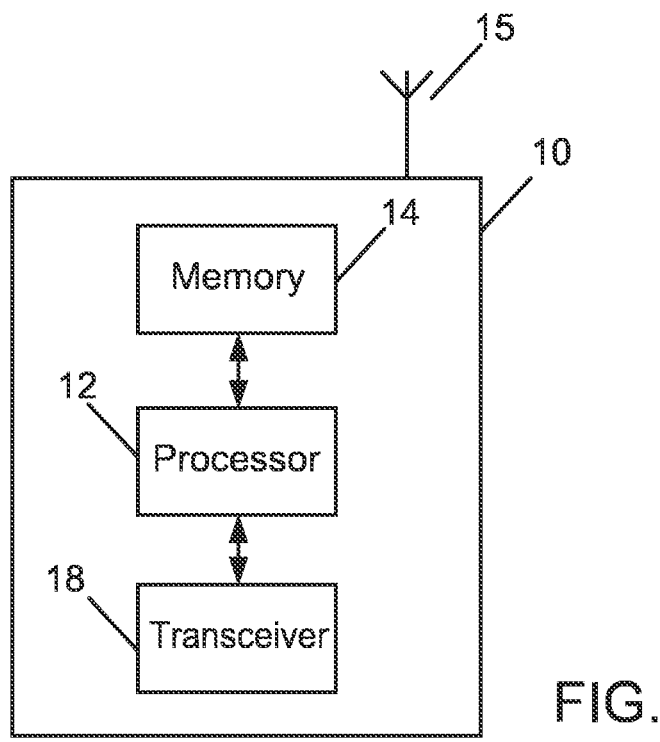
FIG. 16(a) illustrates an apparatus, according to an example embodiment.

FIG. 16(a) illustrates an apparatus 10 according to an example embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 16(a).

As illustrated in the example of FIG. 16(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 16(a), multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-14.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-14.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (110 device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 10 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to determine a propagation delay distance between the user equipment and a network node. Apparatus 10 may also be controlled by memory 14 and processor 12 to convert the propagation delay distance to an index value. Apparatus 10 may further be controlled by memory 14 and processor 12 to calculating a TOA-based index value for a first UL channel timing adjustment for an extended connection range. In addition, apparatus 10 may be controlled by memory 14 and processor 12 to determine a TA-limited cell maximum range based on a requested preamble format broadcasted by the network node. Further, apparatus 10 may be controlled by memory 14 and processor 12 to compare the index value to the timing advance maximum index value.

In addition, apparatus 10 may be controlled by memory 14 and processor 12 to based on the comparison, send a RACH preamble with an initial UL channel timing adjustment to fit an indicated subframe dedicated for a hearing window, and a TOA-based correction index value to establish and maintain an extended range connection with the network node. Further, apparatus 10 may be controlled by memory 14 and processor 12 to report the TOA-based index value to the network node.

Figure 16B:
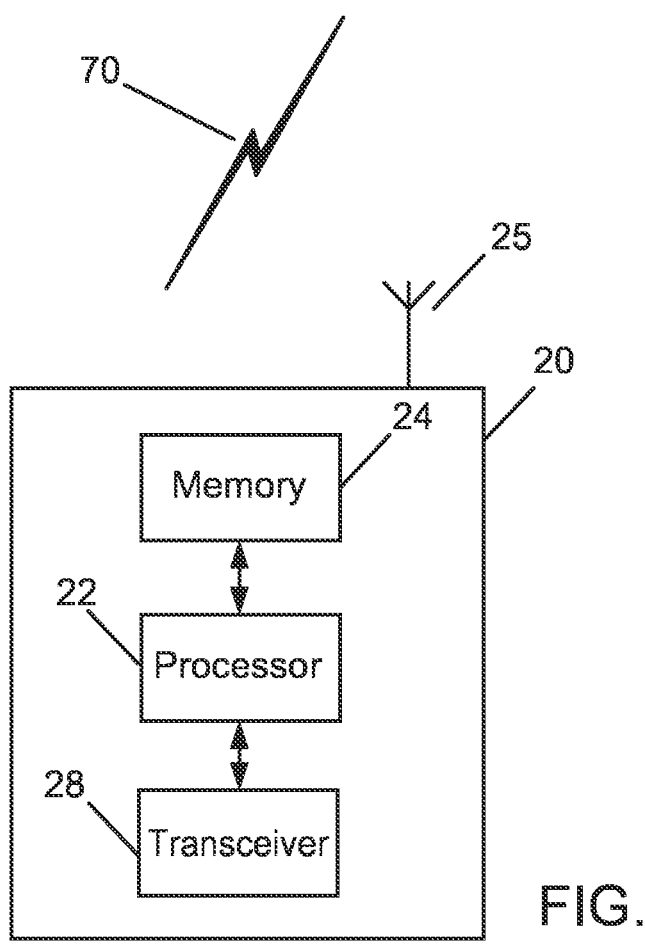
FIG. 16(b) illustrates another apparatus, according to an example embodiment.

FIG. 16(b) illustrates an apparatus 20 according to an example embodiment. In an example embodiment, the apparatus 20 may be a RAT, node, host, or server in a communication network or serving such a network. For example, apparatus 20 may be a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 16(b).

As illustrated in the example of FIG. 16(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 16(b), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-13 and 15.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-13 and 15.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a radio resource manager, RAT, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

For instance, in one embodiment, apparatus 20 may be controlled by memory 24 and processor 22 to transmit TOA data to a UE. Apparatus 20 may also be controlled by memory 24 and processor 22 to receive a report with a TOA-based index value from the UE. In addition, apparatus 20 may be controlled by memory 24 and processor 22 to receive a RACH preamble including at least one of an initial UL channel timing adjustment and a TOA-based correction index value. Further, apparatus 20 may be controlled by memory 24 and processor 22 to establish or maintain a connection with the UE based on at least one of the initial UL channel timing adjustment and the TOA-based correction index value.

According to an example embodiment, the TOA-based index value may include information about how much the UE may be beyond a TA-limited cell maximum range. According to another example embodiment, the RACH preamble may be received with the initial UL channel timing adjustment if the UE is outside the given cell maximum range, and the UE intends to change its state from a RRC idle state to a RRC connected state. According to a further example embodiment, the TOA-based index value may be received earlier if the UE is outside the given cell maximum range, and the UE intends to change its state from a RRC idle state to a RRC connected state. In an example embodiment, the TOA-based correction index value may be received earlier if the UE is outside the given cell maximum range, and the UE intends to change its state from a RRC idle state to a RRC connected state. In another example embodiment, the TOA-based correction index value may be received earlier if the UE is outside the given cell maximum range, and the UE is in a RRC state.

Certain example embodiments described herein provide several technical improvements, enhancements, and/or advantages. In some example embodiments, it may be possible to improve UE mobility handling as the UE may be connected beyond the maximum TA-limited cell range. As such, according to certain example embodiments, the TA technical imitation of cell maximum range may no longer be an issue. According to other example embodiments, it may be possible to impact cell development scenarios where a coverage level is determined by TA. Thus, less sites may be required if a method is applied as the UE may be handled outside the coverage area. In another example embodiment, it may be possible to provide an extension on UE mobility handling in a single overage scenario where connection may be established and maintained from the outside nominal cell coverage. In a further example embodiment, it may be possible to reduce the required number of handovers, as connection may be still maintained outside nominal coverage, beyond MAC CE TA update range.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

A first embodiment is directed to a method that may include determining, by a user equipment, a timing advance-limited cell maximum range based on a requested preamble format broadcasted by a network node. The method may also include in response to the user equipment being outside of the timing advance-limited cell maximum range, sending a random access preamble with an initial uplink channel timing adjustment to fit an indicated subframe dedicated for a hearing window. In a variant, the method may also include in response to the user equipment being outside of the timing advance-limited cell maximum range, additional timing adjustment for any uplink transmission in order to maintain uplink to downlink channel synchronization.

In a variant, the method may further include determining, by the user equipment, a propagation delay distance between the user equipment and the network node.

In a variant, the method may also include converting the propagation delay distance to an index value.

In a variant, the method may further include calculating a time of arrival-based index value for a first uplink channel timing adjustment for an extended connection range.

In a variant, the method may also include comparing the index value to the timing advance maximum index value. In another variant, based on the comparison, the method may include sending a time of arrival-based correction index value to establish and maintain an extended range connection with the network node. In a further variant, the method may include reporting the time of arrival-based index value to the network node.

In a variant, the method may further include receiving time of arrival data from the network node.

In a variant, the time of arrival-based index value may include information about how much the user equipment may be beyond the timing advance-limited cell maximum range.

In a variant, if the timing advance-limited cell maximum range is greater than or equal to the time of arrival-based index value, the method may further include determining that the user equipment is inside a cell timing advance-based maximum range.

In a variant, if the timing advance-limited cell maximum range is less than the time of arrival-based index value, the method may further include determining that the user equipment is outside the timing advance-based maximum range, and sending the random access channel preamble with the time of arrival-based index value to the network node.

In a variant, if the timing advance-limited cell maximum range is less than the time of arrival-based index value, the method may further include determining that the user equipment is outside the TA-based maximum range, and sending the random access channel preamble with the time of arrival-based correction index value.

In a variant, the user equipment is in a radio resource control idle state or a radio resource control connected state.

In a variant, if the user equipment is outside a given cell maximum range, and the user equipment intends to change its state from the radio resource control idle state to the radio resource control connected state, the random access channel preamble may be sent with an initial uplink channel timing adjustment.

In a variant, if the user equipment is outside a given cell maximum range, and the user equipment intends to change its state from the radio resource control idle state to the radio resource control connected state, uplink transmissions may be sent earlier with the time of arrival-based index value.

In a variant, if the user equipment is outside the given cell maximum range, and the user equipment intends to change its state from the radio resource control idle state to the radio resource control connected state, uplink transmissions may be sent earlier with the time of arrival-based correction-index value.

In a variant, if the user equipment is outside the given cell maximum range, and the user equipment is in the radio resource control connected state, uplink transmissions may be sent earlier with the time of arrival-based correction index value.

A second embodiment may be directed to a method that may include transmitting time of arrival data to a user equipment. The method may also include receiving a report with a time of arrival-based index value from the user equipment.

The method may further include receiving a random access channel preamble comprising at least one of an initial uplink channel timing adjustment and a time of arrival-based correction index value. In addition, the method may include establishing or maintaining a connection with the user equipment based on at least one of the initial uplink channel timing adjustment and the time of arrival-based correction index value.

In a variant, the time of arrival-based index value may include information about how much the user equipment may be beyond a timing advance-limited cell maximum range.

In a variant, the random access channel preamble may be received with the initial uplink channel timing adjustment if the user equipment is outside the given cell maximum range, and the user equipment intends to change its state from a radio resource control idle state to a radio resource control connected state.

In a variant, the time of arrival-based index value may be sent earlier if the user equipment is outside the given cell maximum range, and the user equipment intends to change its state from a radio resource control idle state to a radio resource control connected state.

In a variant, the time of arrival-based correction index value may be sent earlier if the user equipment is outside the given cell maximum range, and the user equipment intends to change its state from a radio resource control idle state to a radio resource control connected state.

In a variant, the time of arrival-based correction index value may be sent earlier if the user equipment is outside the given cell maximum range, and the user equipment is in a radio resource control connected state.

Another embodiment is directed to an apparatus including at least one processor and at least one memory including computer program code. The at least one memory and the computer program code may be configured, with the at least one processor, to cause the apparatus at least to perform the method according to the first embodiment or the second embodiment or any of their variants discussed above.

Another embodiment is directed to an apparatus that may include circuitry configured to perform the method according to the first embodiment or the second embodiment or any of their variants.

Another embodiment is directed to an apparatus that may include means for performing the method according to the first embodiment or the second embodiment or any of their variants.

Another embodiment is directed to a computer readable medium including program instructions stored thereon for performing at least the method according to the first embodiment or the second embodiment or any of their variants.

PARTIAL GLOSSARY eNB Enhanced Node B
gNB 5G or NR Base Station
LTE Long Term Evolution
MAC Medium Access Control
MAC CE MAC Command Element
MTOA Measured Time of Arrival
NTN Non-Terrestrial Network
NR New Radio
RAR Random Access Response
TA Timing Advance
TOA Time of Arrival
UE User Equipment

I claim:
1. A method, comprising:
receiving, by a user equipment, time of arrival data from a network node;
determining, by the user equipment, a propagation delay distance between the user equipment and the network node, wherein the propagation delay distance is calculated using $D(Ts)=c*(T_1(Ts)-T_0(Ts))[m]$, wherein $T_0$ represents a reference signal physical transmission time by the network node, $T_1$ represents a reference signal reception time by the user equipment, c represents the speed of light, Ts represents a basic time unit, and $D(Ts)$ represents the propagation delay distance;
converting the propagation delay distance to an index value;

determining, by aby the user equipment, a timing advance-limited cell maximum range based on a requested preamble format broadcasted by a network node;

comparing the index value to the timing advance-limited cell maximum range; and based on the comparison of the index value and the timing advance-limited cell maximum range, sending a random access preamble with an initial uplink channel timing adjustment to fit an indicated subframe dedicated for a hearing window.

2. The method according to claim 1, further comprising calculating a time of arrival-based index value for a first uplink channel timing adjustment for an extended connection range.

3. The method according to claim 2, wherein if the timing advance-limited cell maximum range is less than the time of arrival-based index value, the method further comprises:

determining that the user equipment is outside a cell timing advance-based maximum range; and sending a random access channel preamble with at least one of: the time of arrival-based index value to the network node, or a time of arrival-based correction index value.

4. The method according to claim 1, wherein the user equipment is in a radio resource control idle state or a radio resource control connected state.

5. An apparatus, comprising:

at least one processor; and at least one memory comprising computer program code, the at least one memory and the computer program code are configured, with the at least one processor to cause the apparatus at least to:

receive time of arrival data from a network node;

determine a propagation delay distance between the user equipment and the network node, wherein the propagation delay distance is calculated using $D(Ts) = c*(T_1(Ts) - T_0(Ts))[m]$, wherein $T_0$ represents a reference signal physical transmission time by the network node, $T_1$ represents a reference signal reception time by the user equipment, c represents the speed of light, Ts represents a basic time unit, and $D(Ts)$ represents the propagation delay distance;

convert the propagation delay distance to an index value;

determine a timing advance-limited cell maximum range based on a requested preamble format broadcasted by a network node;

compare the index value to the timing advance-limited cell maximum range and based on the comparison of the index value and the timing advance-limited cell maximum range, send a random access preamble with an initial uplink channel timing adjustment to fit an indicated subframe dedicated for a hearing window.

6. The apparatus according to claim 5, wherein the at least one memory and the computer program code are further configured, with the at least one processor to cause the apparatus at least to calculate a time of arrival-based index value for a first uplink channel timing adjustment for an extended connection range.

7. The apparatus according to claim 6, wherein if the timing advance-limited cell maximum range is less than the time of arrival-based index value, the at least one memory and the computer program code are further configured, with the at least one processor to:

determine that the apparatus is outside a cell timing advance-based maximum range; and send a random access channel preamble with at least one of: the time of arrival-based index value to the network node, or a time of arrival-based correction index value.

8. The apparatus according to claim 5, wherein the at least one memory and the computer program code are further configured, with the at least one processor to cause the apparatus at least to receive time of arrival data from the network node.

9. The apparatus according to claim 8, wherein the time of arrival data comprises at least one of a reference signal physical transmission time by the network node, or an ON/OFF indicator to enable/prohibit the possibility to establish a connection by the apparatus outside of the timing advance-limited cell maximum range.

10. The apparatus according to claim 5, wherein the apparatus is in a radio resource control idle state or a radio resource control connected state.

* * * * *